Figure 1:
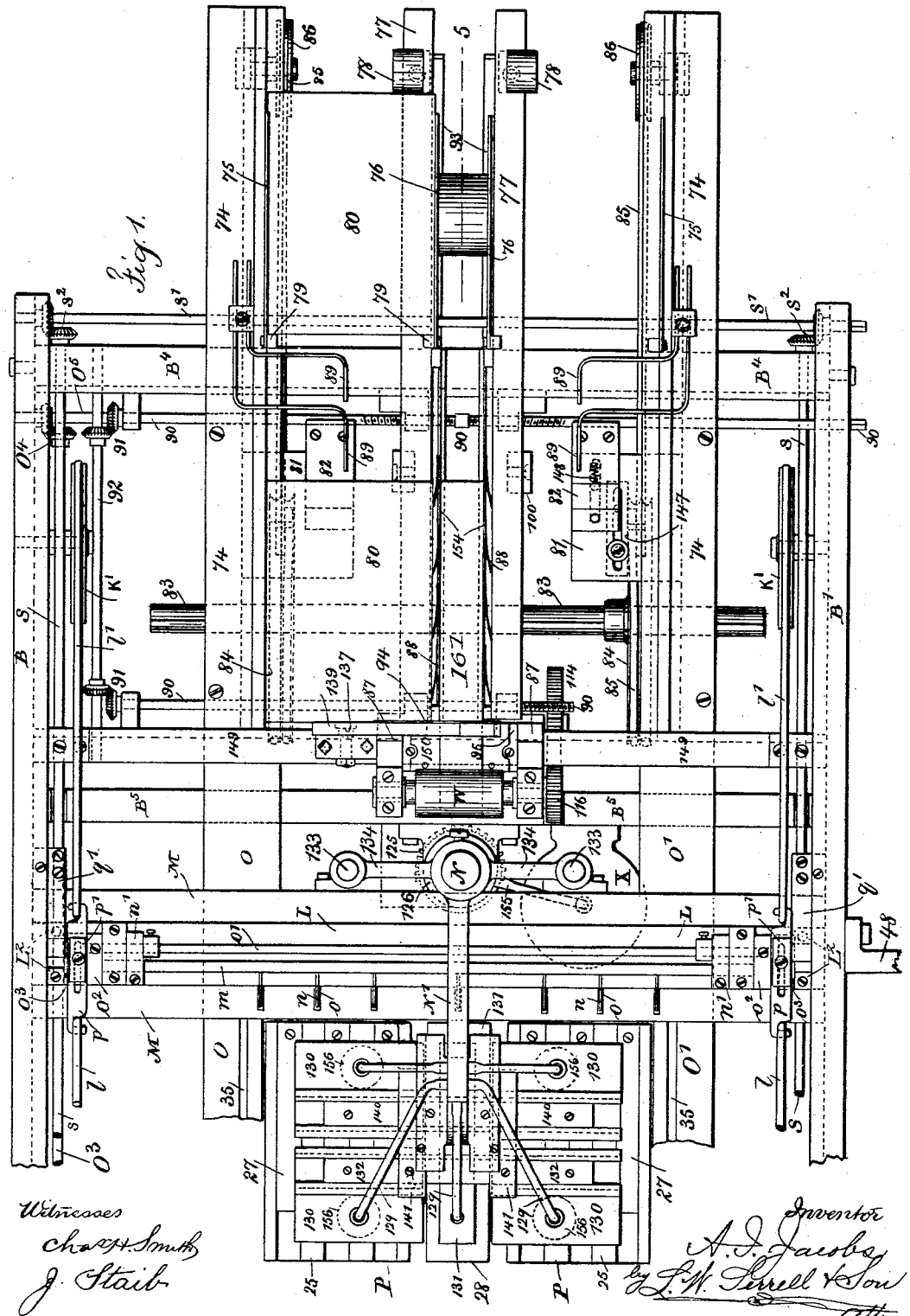

(No Model.) 13 Sheets—Sheet 1.

A. I. JACOBS.
MACHINE FOR MAKING BOOK COVERS.

No. 580,111. Patented Apr. 6, 1897.

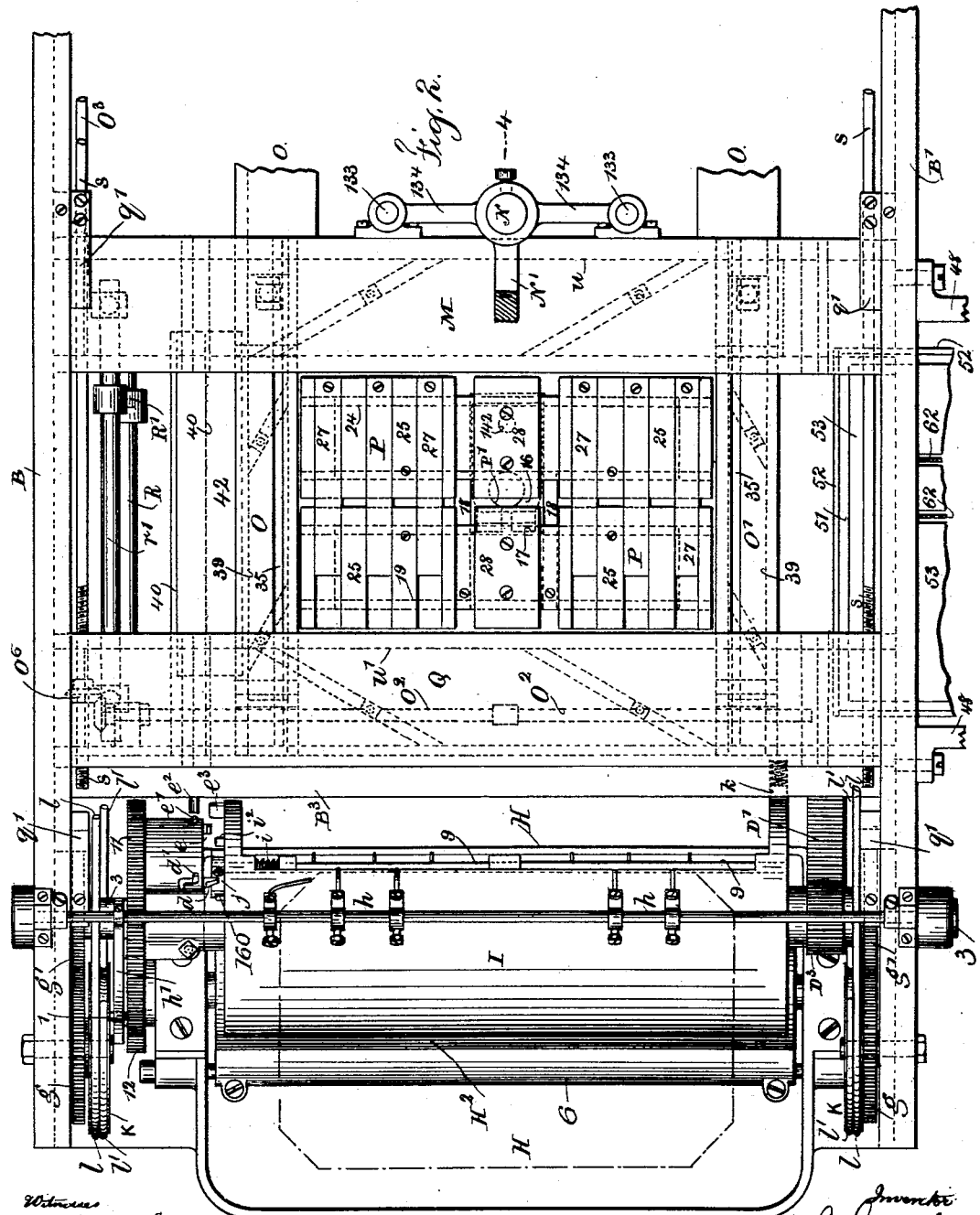

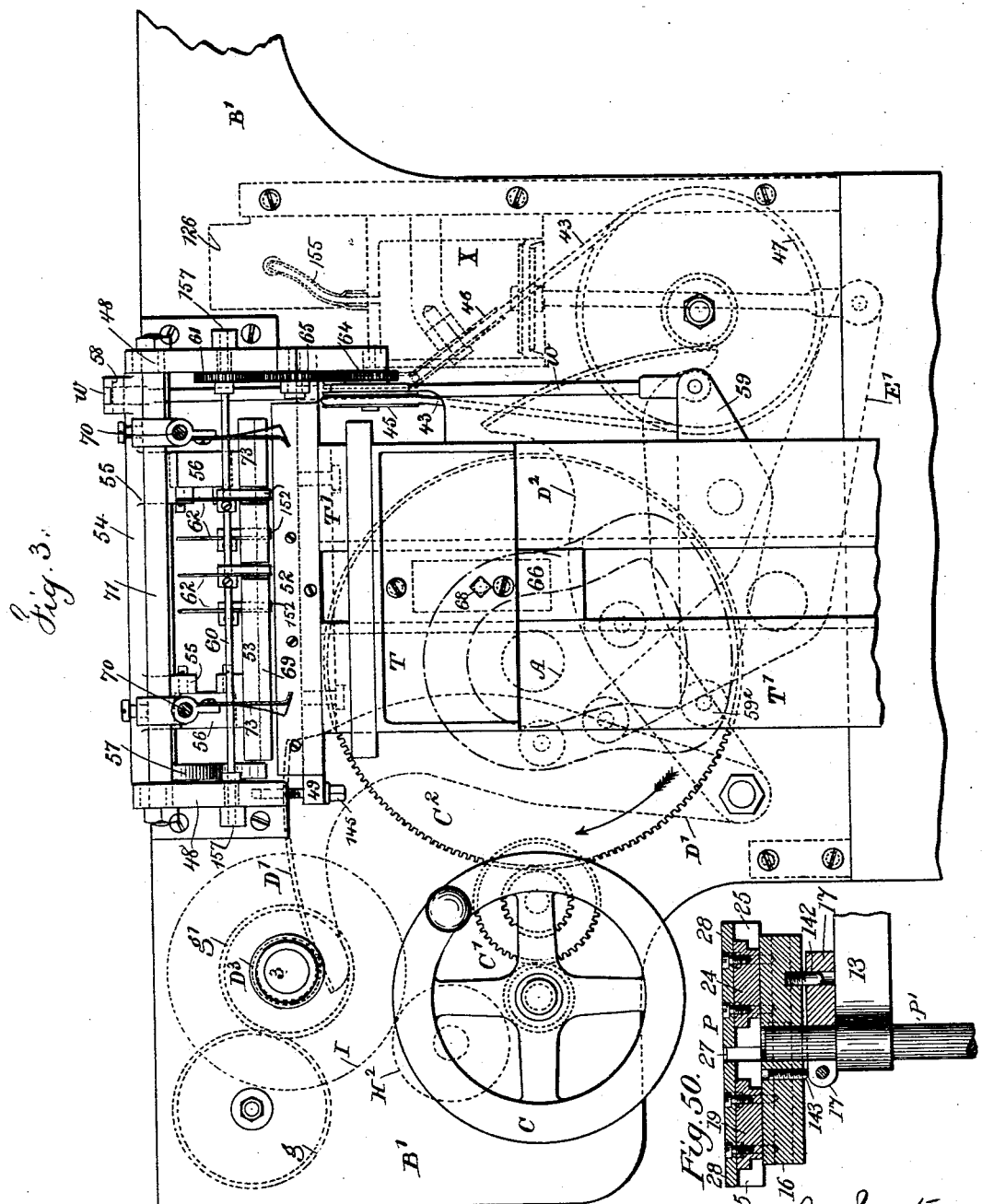

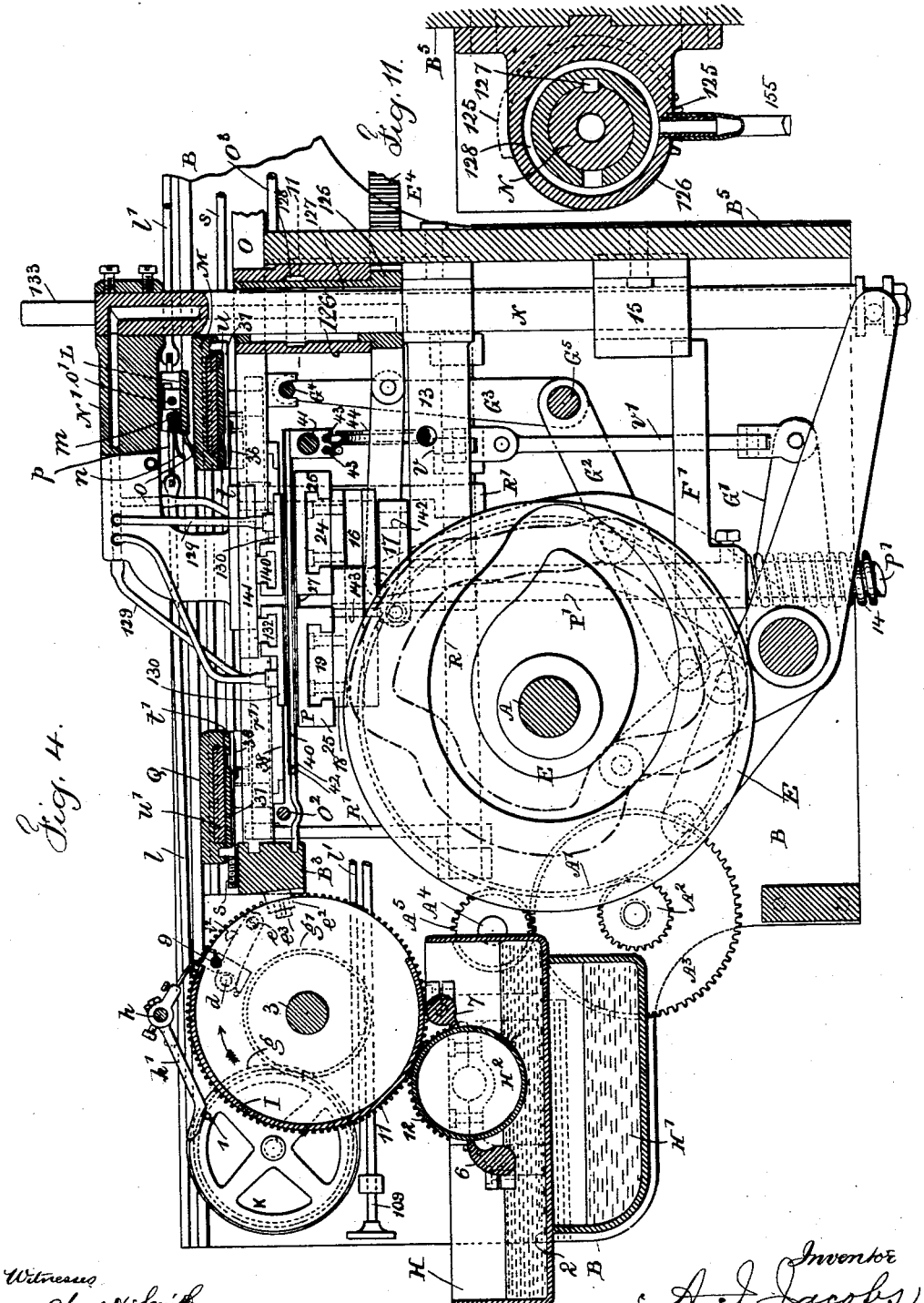

(No Model.)
A. I. JACOBS.
MACHINE FOR MAKING BOOK COVERS.
No. 580,111. Patented Apr. 6, 1897.
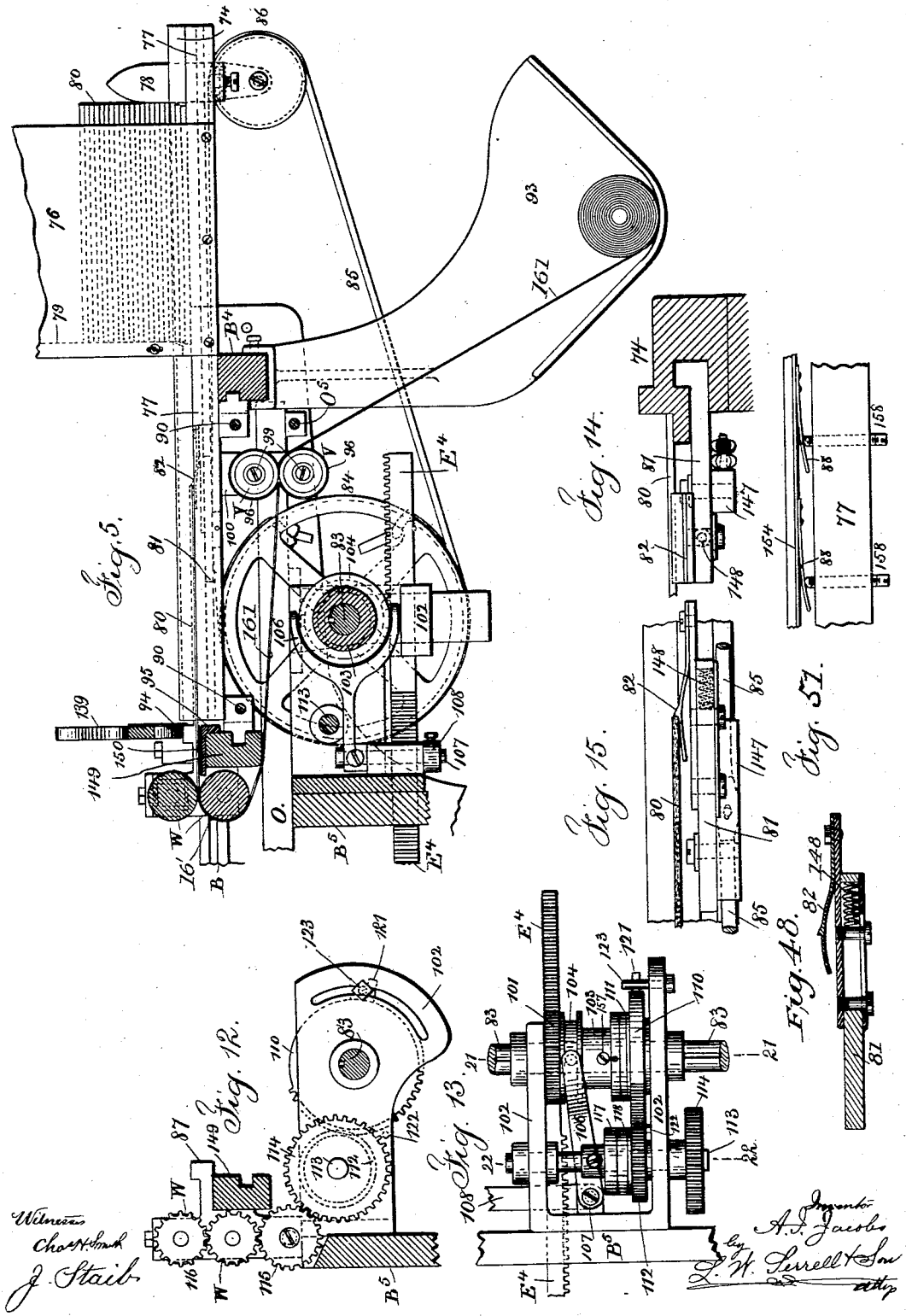

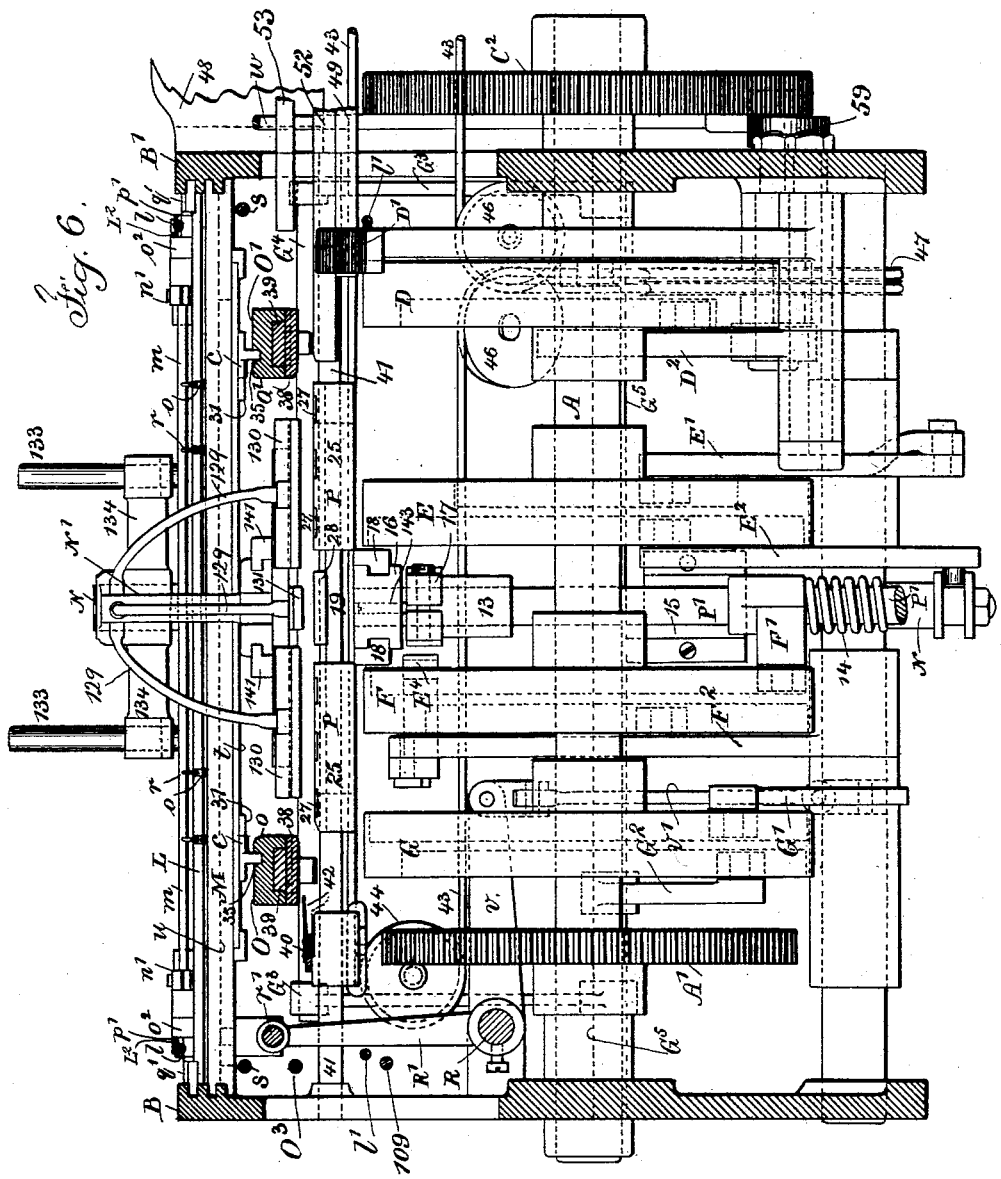

(No Model.) 13 Sheets—Sheet 7.
A. I. JACOBS.
MACHINE FOR MAKING BOOK COVERS.
No. 580,111. Patented Apr. 6, 1897.
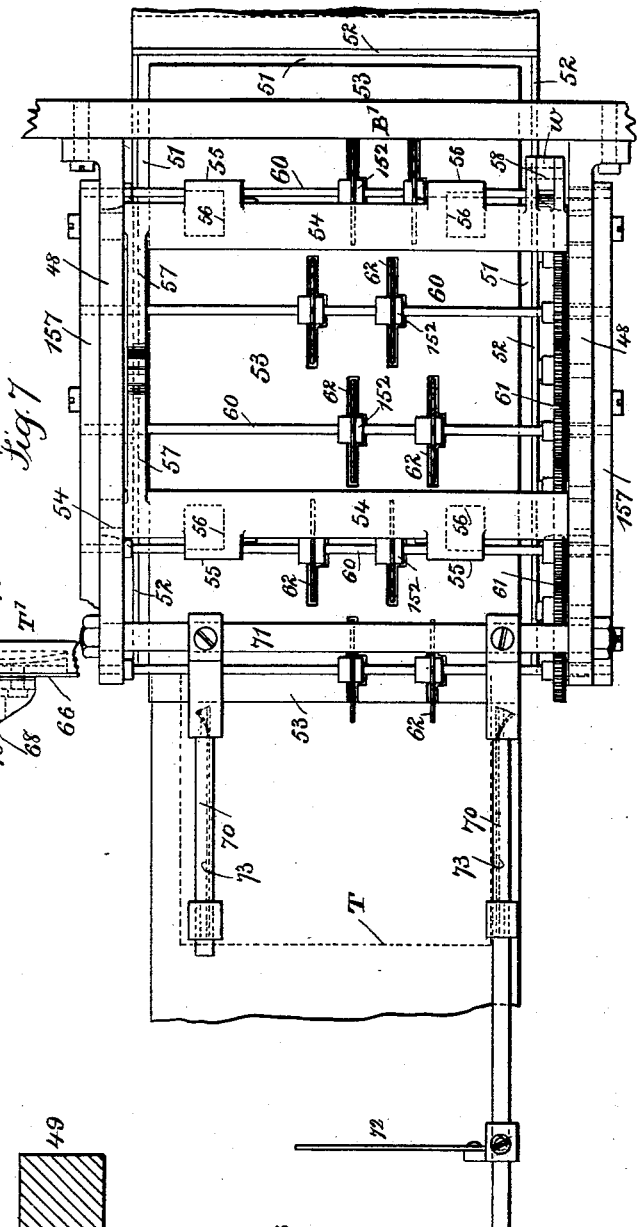
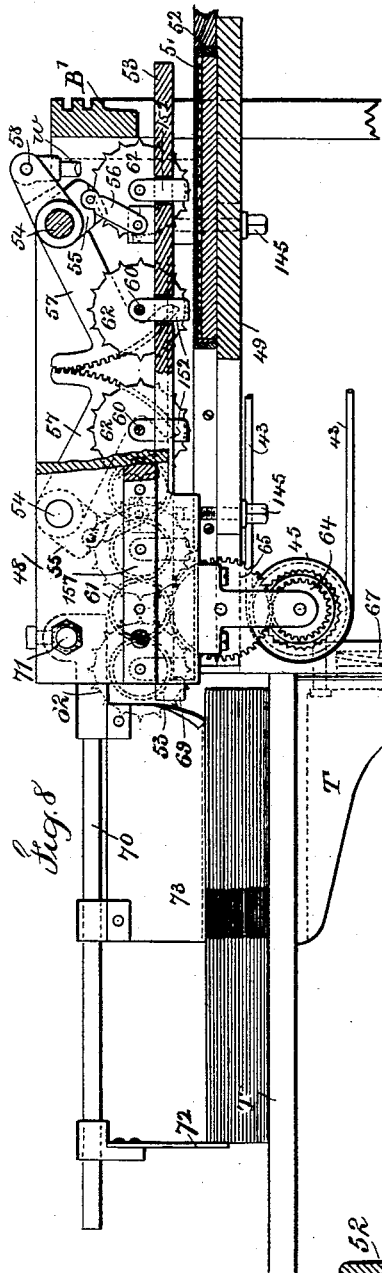
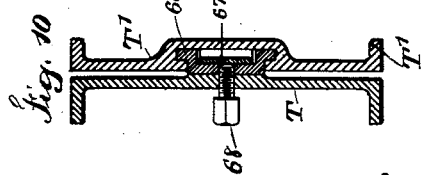

(No Model.)  13 Sheets—Sheet 8.
A. I. JACOBS.
MACHINE FOR MAKING BOOK COVERS.
No. 580,111.  Patented Apr. 6, 1897.
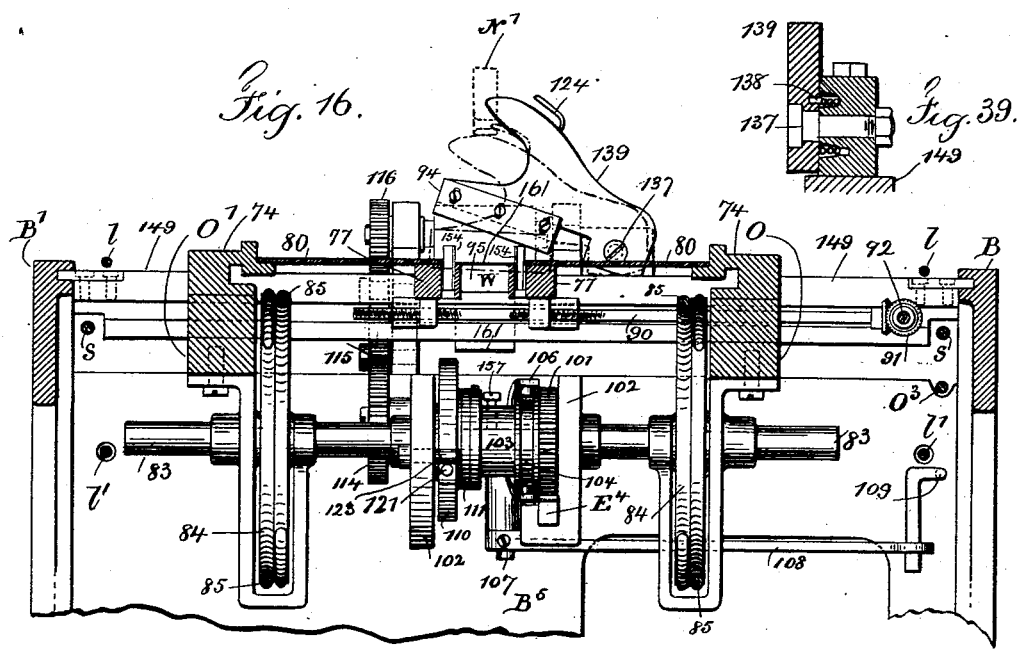
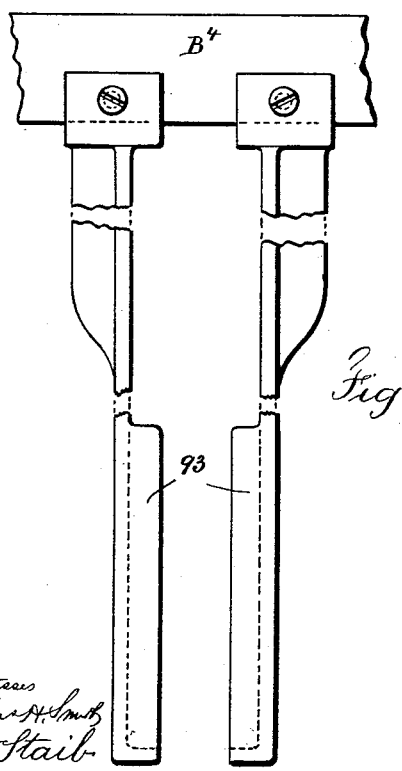
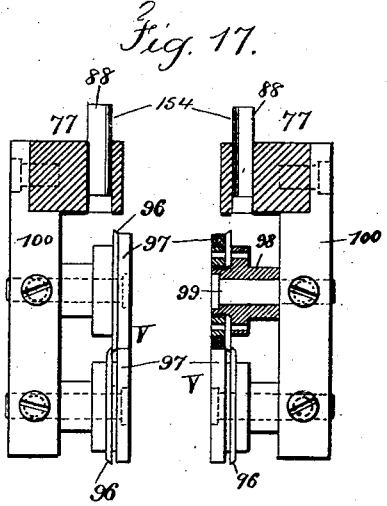
Witnesses
Chas. H. Smith
J. Staib
Inventor
A. I. Jacobs
by L. W. Serrell & Son
Attys
THE NORRIS PETERS CO., PHOTO-LITHO., WASHINGTON, D. C.

(No Model.) 13 Sheets—Sheet 9.
A. I. JACOBS.
MACHINE FOR MAKING BOOK COVERS.
No. 580,111. Patented Apr. 6, 1897.
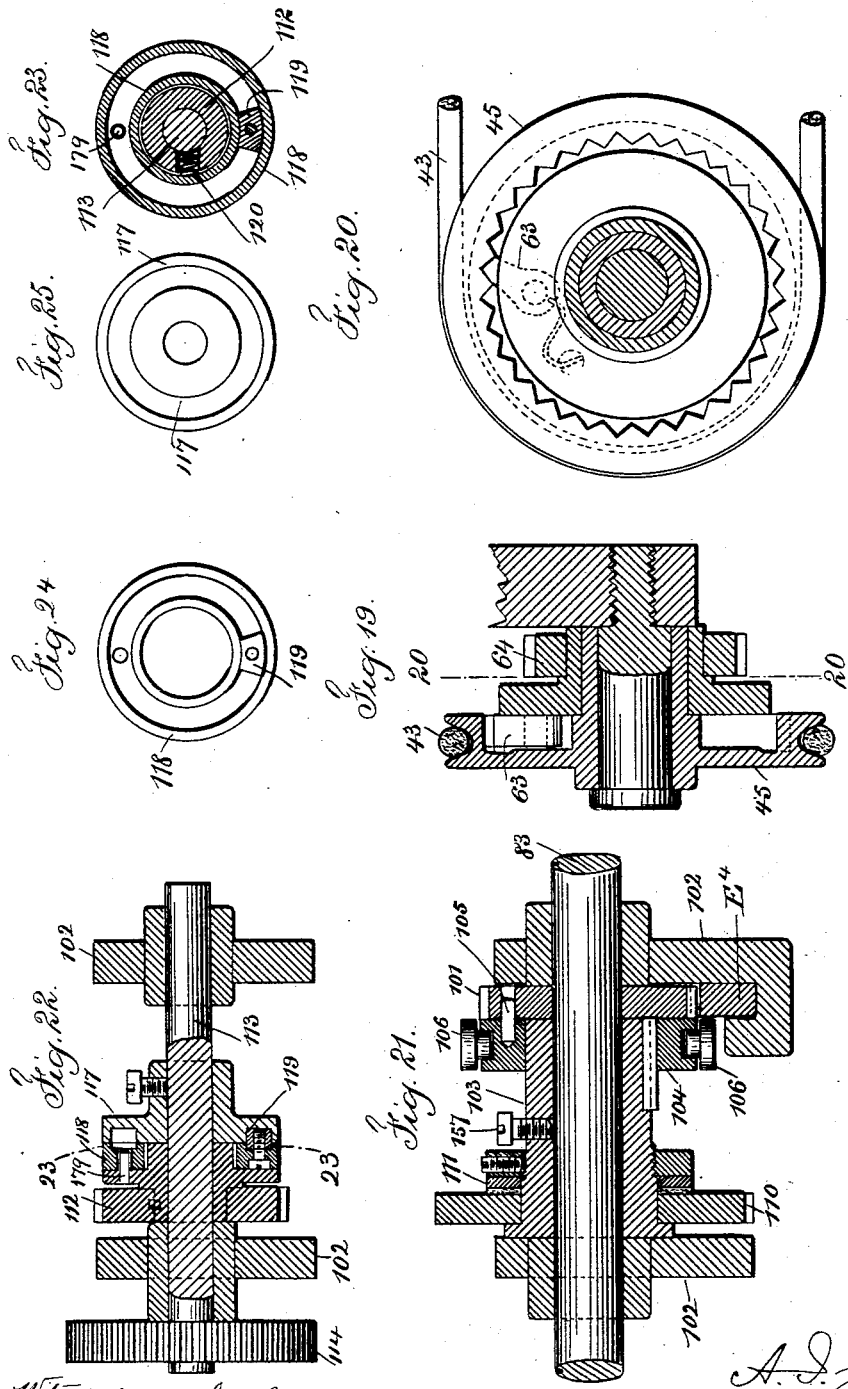

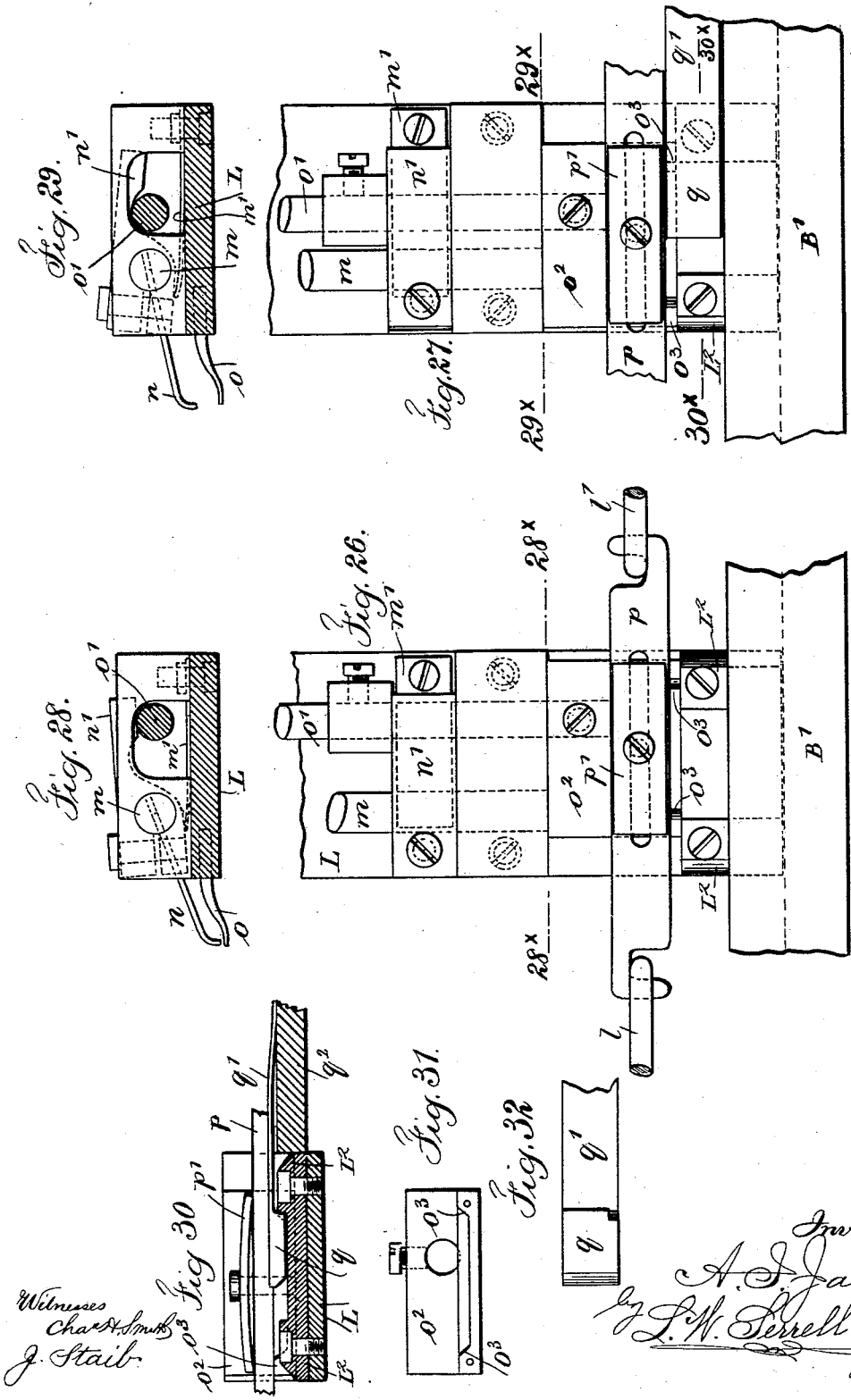

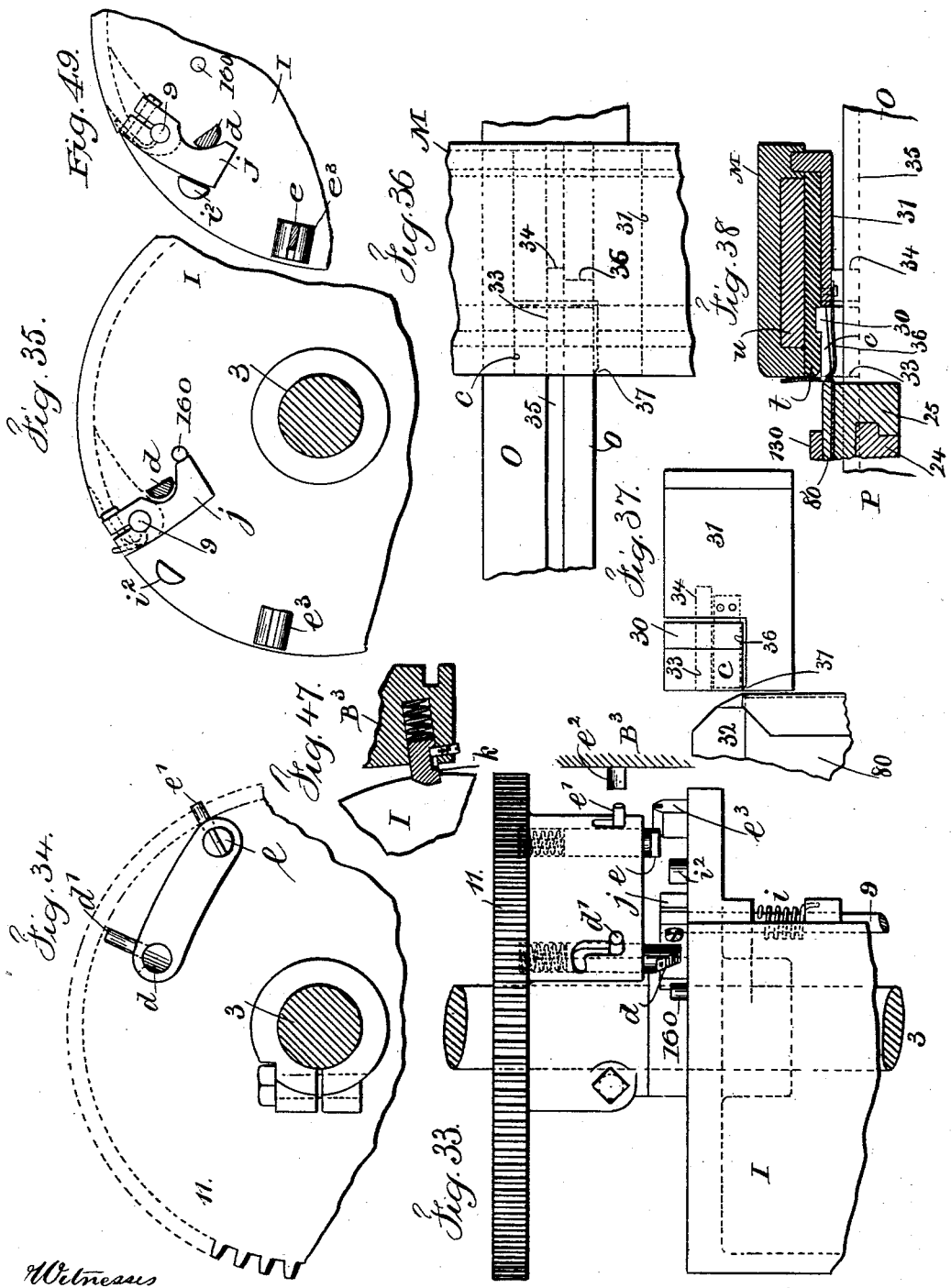

(No Model.) 13 Sheets—Sheet 12.
A. I. JACOBS.
MACHINE FOR MAKING BOOK COVERS.
No. 580,111. Patented Apr. 6, 1897.
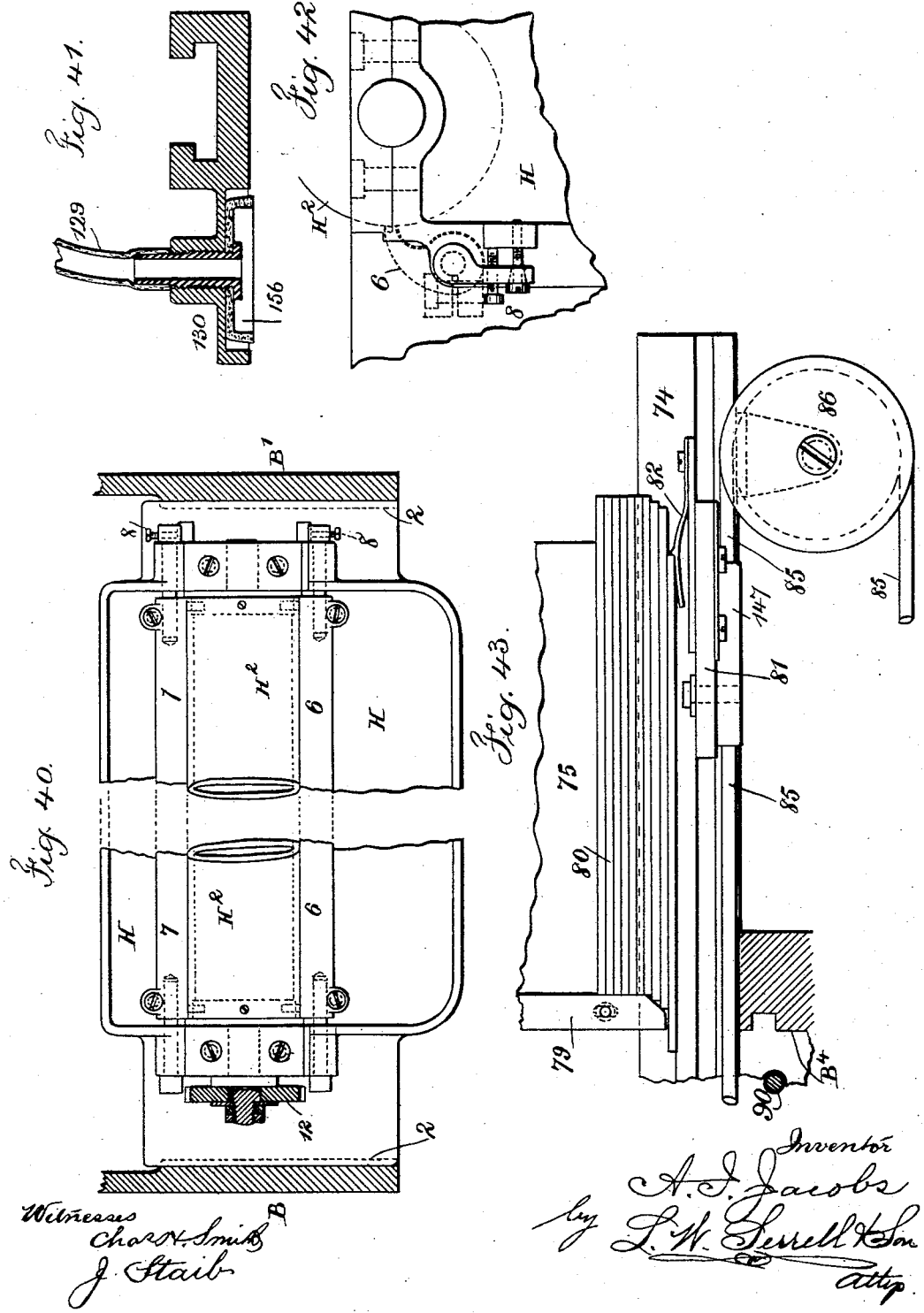

(No Model.)  
13 Sheets—Sheet 13.

A. I. JACOBS.
MACHINE FOR MAKING BOOK COVERS.

No. 580,111. Patented Apr. 6, 1897.

UNITED STATES PATENT OFFICE.

ARTHUR I. JACOBS, OF HARTFORD, CONNECTICUT, ASSIGNOR TO THE SMYTH MANUFACTURING COMPANY, OF SAME PLACE.

MACHINE FOR MAKING BOOK-COVERS.

SPECIFICATION forming part of Letters Patent No. 580,111, dated April 6, 1897.

Application filed August 19, 1896. Serial No. 603,207. (No model.)

*To all whom it may concern:*

Be it known that I, ARTHUR I. JACOBS, a citizen of the United States, residing in the city and county of Hartford, in the State of Connecticut, have invented an Improvement in Machines for Making Book-Covers, of which the following is a specification.

This invention is an improvement upon that set forth in Letters Patent No. 513,453, granted January 23, 1894, to The Smyth Manufacturing Company, assignees of Charles A. Coles, Albert E. Coles, John C. Smith, William Jamieson, and Arthur I. Jacobs.

In machines that have heretofore been made for manufacturing book-covers difficulty has arisen where the cloth is passed in from a roll, glued, and cut off to shape in consequence of the waste of material when the machine has to be stopped or when the size of the cover has to be changed, and in addition to this the glue becomes set or chilled rapidly when the machine is stopped, and the chilled glue interferes with the proper spreading of the adhesive material upon the muslin, and in practice it is found that the loss of only a small percentage of the covers when produced by machinery renders such machinery substantially valueless financially.

In the present machine the glue-cylinder is revolved first in one direction and then in the other, and there are two scrapers acting in opposite directions, and any material adhering to the surface of the cylinder is scraped off by one scraper, and the other scraper allows the surface from which the glue is taken to the muslin to have the proper quantity of glue upon it, and it is kept free from foreign substances.

The cloth or covering fabric cut out of the proper shape is received upon a cloth segment and held by grippers at the advancing edge, and the cloth is brought into contact with the glue-roll as the segment makes one revolution. The cloth is taken by grippers upon a gripper-bar that is moved laterally to carry the cloth over a platform that is moved up to position, and a picker composed of hollow bars supported by an arm upon a vertical shaft is brought down upon the cover-boards and the back-lining, and by a suction action these are picked up, the picker and shaft receive a half-revolution, and the picker presses the cover-boards and the back-lining down upon the glued muslin and then forces the platform down, and there are side bars and edge-turners to act upon the top and bottom edges of the muslin and fold the same over upon the board. The platform is pressed upward sufficiently to force the edges of the glued muslin firmly down upon the upper surfaces of the boards. The platform is then pushed down farther, and the side-folders come in that turn the right and left hand edges of the fabric over upon the cover-boards. A second pressure is given by the platform rising, and then it descends. A discharge-slide carries the completed cover out laterally into a finishing-press and above a water-bag, and there are a platen and toggle-bars that press down upon the cover, and the pressure is equalized by the action of the water-bag, so that the entire cover is not only held, but subjected to a pressure sufficient to cause the glue to firmly adhere, and the glue, becoming chilled, holds the cover firmly to the boards and back-lining. The platen is raised and the completed cover carried out by toothed disks, and the pile of covers is supported by a shelf held by friction and forced down progressively as the covers accumulate.

The cover-boards are piled in receptacles, and a bottom board from each pile is carried out into position to be taken by the picker, and the parts are constructed so that the boards are guided at the outer and bottom edges and brought accurately to position, so that the external measurements of the covers will be precisely alike, regardless of any inaccuracy in the size of the cover-boards themselves, and the back-lining is made from a strip of paper that is fed in progressively the proper length corresponding to the height of the cover-boards, and there are cutters for determining the width of the lining, which cutters are adjusted simultaneously with the adjustment of the bars and parts that carry the cover-boards, so that the proper width of paper for the back-lining is automatically insured. Hence a roll of paper adapted to back-lining need not be changed for every variation in the width of such back-lining, because surplus in width is cut off automatically, and the back-lining, after being projected into position between the cover-boards, is cut off as the picker comes down to take up the cover-boards and back-lining by the suction action.

Bearing in mind the foregoing statements in relation to the general operations performed in the machine, the details of construction and operation will be more fully apparent upon reference to the following specification and to the drawings, wherein—

Figure 44:
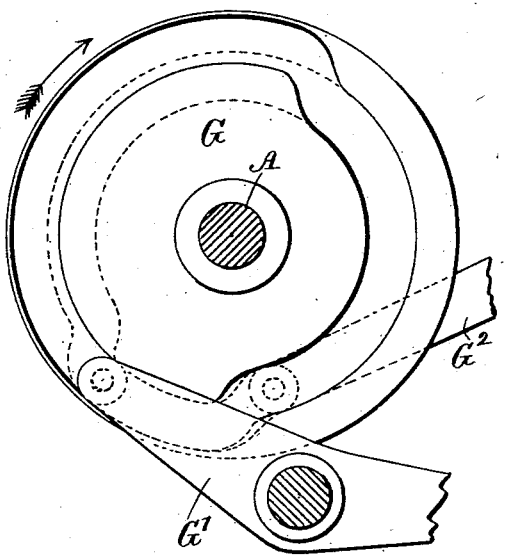
Figure 45:
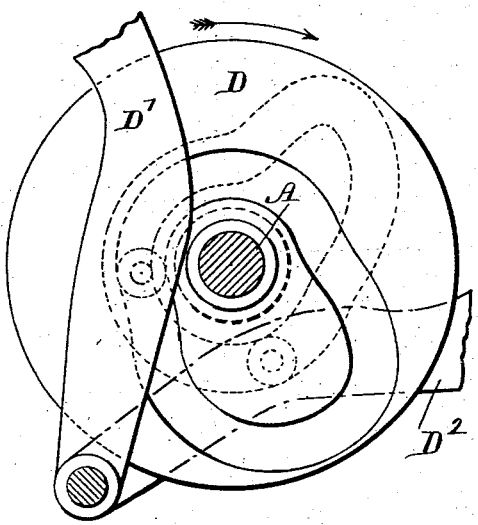
Figure 46:
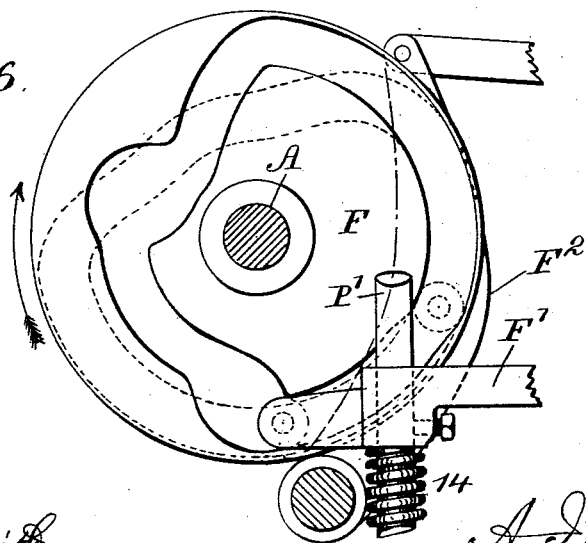

Figure 1 is a plan view showing the rear half of the machine. Fig. 2 is a similar plan view showing the front half of the machine. Fig. 3 is a partial elevation at the right side of the machine. Fig. 4 is a longitudinal section at the line 4 of Fig. 2 with the picker and platform in elevation. Fig. 5 is a longitudinal section near the line 5 of Fig. 1. Fig. 6 is a cross-section of the machine near the main shaft, illustrating the general positions of the cams for giving motion to the different parts. Fig. 7 is a plan view, and Fig. 8 an elevation and partial section, of the finishing-press. Fig. 9 is a detached view at one edge of the water-bag. Fig. 10 is a sectional plan at the line 10 of Fig. 8. Fig. 11 is a detached horizontal section in larger size of the picker-shaft at the line 11 of Fig. 4. Fig. 12 is a side view of the rolls and gearing for feeding in the back-lining. Fig. 13 is a plan view of the same. Fig. 14 is a cross-section of the side bar and slide for bringing in the cover-board, and Fig. 15 is a detached elevation of the same. Fig. 16 is a cross-section of the machine, representing the cutter for severing the back-lining. Fig. 17 is an elevation and partial section showing the cutters for determining the width of the back-lining. Fig. 18 is an elevation of the troughs for holding the roll of back-lining. Fig. 19 is a section through the pulley that gives motion to the discharging apparatus of the finishing-press. Fig. 20 is a section at the line 20 of Fig. 19. Fig. 21 is a longitudinal section, in larger size, through the shaft and gearing at the line 21, Fig. 13. Fig. 22 is a similar section at the line 22, Fig. 13. Fig. 23 is a section at the line 23 of Fig. 22, and Figs. 24 and 25 are elevations of the frictional clamping devices. Fig. 26 shows the parts at one end of the gripper-shaft and the end of the cross-bar L and parts carried by it adjacent to the side frame B'. Fig. 27 illustrates the same parts and a portion of the holding-spring $q'$. Fig. 28 is a cross-section at the line $28^\times 28^\times$, and Fig. 29 is a cross-section at the line $29^\times 29^\times$. Fig. 30 is a section at the line $30^\times 30^\times$. Fig. 31 shows one of the slide-blocks and the lifter detached. Fig. 32 is an inverted plan at the end of one of the stationary springs. Fig. 33 is a plan view at one end of the cloth segment in larger size. Fig. 34 shows part of the gear-wheel and the bolts carried by it. Fig. 35 is a partial elevation at one end of the cloth segment. Fig. 36 is a plan representing the position of the nicker-in, and Fig. 37 is a detached view of the nicker-in and its stock and also a portion of the corner of one of the covers. Fig. 38 is a cross-section of one of the folders, showing the nicker-in and its stock and part of the platform with part of the cover thereon. Fig. 39 is a cross-section in larger size at the pivot of the back-lining shear. Fig. 40 represents the ends of the glue vessel and the glue-roll. Fig. 41 is a cross-section of one of the picker-blocks for the cover-boards. Fig. 42 is an elevation in larger size of the means for adjusting the arbor and glue-scraper 6. Fig. 43 is a section and elevation representing the piles of cover-boards, the slider, and the stop-bar. Fig. 44 is an elevation of the cams for the first and second turners. Fig. 45 shows the cams for actuating the cloth segment and the discharge-slide. Fig. 46 shows the cams for the platform and for revolving the picker, and Fig. 47 shows the stop for the cloth segment in section. Fig. 48 is a detached sectional view of the slide and claw. Fig. 49 is a diagram of the arm $j$ and parts when the cloth segment is being rotated, and Fig. 50 is a section of the platform and its supports. Fig. 51 is a plan view showing two of the springs that guide the edges of the cover-boards and the screws for adjusting said springs.

The cam-shaft A is supported by the frames B B', and it is driven by any suitable mechanism. The gear-wheel A', Figs. 3 and 6, is shown as receiving motion from a pinion $A^2$, that is connected with the gear-wheel $A^3$ upon a stud extending out from the frame B, and the power is applied to a shaft $A^4$ and pinion $A^5$ to drive the wheel $A^3$, and the shaft $A^4$ has fast and loose pulleys outside of the frame driven by a belt provided with a belt-shifter of any desired character, so that the cam-shaft A can be driven with the necessary power or stopped when necessary, and in order to move the machine by hand a hand-wheel C, Fig. 3, is provided with gearing C' to the wheel $C^2$ upon the end of the cam-shaft A outside the frame B'.

Upon the cam-shaft A, Fig. 6, the cam D is grooved upon the right side to act upon the segmental rack-lever D', that gives motion to the cloth segment. The groove on the left side of the cam D acts upon the rack-lever $D^2$, that gives motion to the discharging-slide. The cam E is grooved on its right side to operate the lever E' to the exhaust-pump, and the groove on the left side of the cam E acts upon the lever $E^2$ for raising and lowering the picker-shaft. The cam F is grooved upon its right side to act upon the lever F', that raises and lowers a platform, and the groove upon its left side acts upon the lever $F^2$, that acts to revolve the picker and give motion to the rack. The cam G is grooved on its right side and acts upon the lever G', that gives motion to the turners at the top and bottom of the cover, and the lever $G^2$ is acted upon by the groove at the left side of the cam and actuates the second turners. It is unnecessary to give in detail the shapes of the grooves in these respective cams, because these are laid out with reference to giving motion to the respective levers and performing the operations hereinafter indicated and in the order designated, so that the operations are performed successively, as described; but these cams are illustrated in Figs. 3, 4, 44, 45, and 46.

The glue-holding vessel H, Figs. 2, 4, and 40, is provided with flanges that extend out at its ends and are received between the horizontal ribs 2 on the inner sides of the frames B B', so that such glue vessel can be easily drawn out for cleansing or replaced, and beneath the glue vessel is a vessel H', having similar flanges by which it can be supported at its ends or drawn out, as may be necessary, and this vessel H' is to hold hot water for heating the glue, and it is advantageous to provide a Bunsen burner or other heater for the water vessel, or steam may be led into the water to maintain the proper temperature.

Within the glue vessel H is a roller $H^2$, supported in bearings at the ends of the glue vessel H, and this glue-roller $H^2$ is advantageously made as a copper cylinder with heads connecting the same to the shafts at the ends of the glue-roller, and there are scrapers 6 and 7, that are supported by pivots at the ends, and they are adjusted by screws 8, so that the edges of the scrapers are in the desired proximity to the surface of the glue-roller, and this glue-roller is rotated first in one direction and then in the other by the means hereinafter described; but the gear 12 is held by friction of the shaft of the glue-roll, so as to turn without injury to the parts if the glue-roll is held by the chilling of the glue or otherwise.

The scraper 6, Figs. 2, 4, and 42, is advantageously set in such a manner as to scrape almost all the glue off the surface of the glue-roller, and the scraper 7 is set with reference to allowing the proper amount of glue to remain upon the surface of the roller for properly gluing the muslin or covering fabric by coming into contact with the same; and it will be observed that the glue and other material adhering to the surface of the roller $H^2$ as it is removed by the scraper 6 slides down upon the convex surface of such scraper 6 and returns into the glue vessel H at a little distance from the roller, and hence foreign substances will be in the glue at the side near the operator, where they can be observed and removed, and the cleaner glue will be at the back portion of the glue vessel ready to pass up on the surface of the roller $H^2$ as the same is brought into contact with the covering fabric upon the cloth segment I. This cloth segment I, Figs. 2, 4, 33, 34, and 35, is loose upon the shaft 3, but is connected therewith at the proper time by the devices hereinafter described, and this shaft 3 is rotated first in one direction and then in the other at the proper time by the pinion $D^3$ and segmental rack D', acted upon by the cam D, as before mentioned. This segmental rack is shown by dotted lines in Fig. 3 and in the plan view, Fig. 2, and the gear-wheel 11 upon the shaft 3 gears into the wheel 12 upon the shaft of the glue-roll, so that this glue-roll is moved backward and forward constantly while the machine is in motion, but the cloth segment I is entirely under the control of the attendant, so that he can stop the same, and it remains without being moved until he brings in the actuating mechanism by the action of his hand. For this reason the supply of the covering fabric or muslin can be stopped and a partially-finished cover completed and the movements arrested with the machine substantially empty, there being no incomplete book-cover in the machine. This is of great advantage, because if the machine is stopped after a fabric cover has been glued and before the boards and back-lining are applied to the same and the edges turned over and completed such cover is valueless, because it cannot be finished after the glue has cooled or set, and in consequence of the supply of the covering fabric being entirely under the control of the attendant and independent of the other operations of the machine there is no risk of the covering fabric being carried in until after it has been properly placed upon the cloth segment; and it is to be understood that a complete cover is produced at each revolution of the cam-shaft A, but should the covering material not be in position the automatic movement of the cloth segment at the proper time is suspended by the attendant until the parts come around to give motion to the cloth segment at the proper time, so that the cloth is fed in in harmony with the other parts of the machine.

It is to be understood that the fabric is cut out to shape in any desired manner and fed by hand to the cloth segment.

The cloth segment I is preferably made of metal and rather more than half of a cylinder, and there are heads to this cloth segment by which it is supported upon the shaft 3, and between the heads of the cloth segment the gripper-shaft 9 extends adjacent to one edge of the cloth segment, and the grippers upon this shaft are in the form of short hooks, so that when the gripper-shaft is partially rotated these hooks swing over and catch the edge of the cloth as it is applied upon the cloth segment, and there is a spring $i$ to open these grippers, and I provide a gage in the form of a cross-shaft $h$, supported at its ends on the frames B B' and provided with fingers projecting from eyes upon the shaft and provided with set-screws, so that the fingers can be put in any desired position to indicate where the covering-cloth is to be placed upon the cloth segment, and there are two gear-wheels $g$ $g'$, the wheel $g'$ being upon the shaft 3 and the wheel $g$ is upon a stud supported by the frame B. The band-wheel K is secured to the wheel $g$ and there is a stud 1 upon said wheel K, acting upon an arm $h'$ of the gage, and the position of these parts is such that when a pause occurs in the revolution of the shaft 3 in one direction the parts are in the position shown in Fig. 4, with the gage-fingers in place closely adjacent to the surface of the cloth segment, and as the shaft 3 and the gears $g$ $g'$ commence to move in the opposite direction the pin 1 moves from under the arm $h'$ and allows the fingers of the gage to rise out of the way of the cloth segment as it is carried away by the grippers upon the cloth segment.

Upon the gear 11 is a lateral projection toward the end of the cloth segment, (see Figs. 33 and 34,) and in this projection are spring-bolts $d$ and $e$, projected toward the end of the cloth segment, and the end of the spring-bolt $d$ is inclined so as to form a latch, and there is a stud $d'$ projecting from the spring-bolt $d$ through an L-shaped slot in the projection upon the gear 11, and the attendant seizing this stud $d'$ can pull back the spring-bolt $d$ and hold it in position by turning the stud into the right-angled end of the slot, and when this spring-bolt $d$ is in this retracted position the gear 11 can turn first one way and then the other way without the cloth segment being moved, and when the attendant is ready to bring the cloth segment into action he simply liberates the stud $d'$ and the spring projects the spring-bolt $d$ for effecting the operations next described.

On the end of the gripper-shaft 9 there is an arm $j$, normally arrested by a stud 160, as shown in Figs. 33 and 35, and as the gear 11 commences to turn in the direction of the arrow shown in Fig. 4 the bolt $d$ engages the arm $j$ and swings the grippers so that they grasp the advancing edge of the covering fabric that has been laid upon the cloth segment, and the arm $j$ is arrested by a stop $i^2$ upon the end of the cloth segment, and the further movement of the bolt $d$ commences the rotation of the cloth segment, the parts being in the position shown in the diagram Fig. 49 in the same direction, and upon the bolt $e$ there is a stud $e'$, projecting through a slot, and there is a stationary V-shaped cam $e^2$ upon the cross-piece $B^3$ of the frame, and the end of the bolt $e$ is flat or shaped like a plate to pass into a notch in the projection $e^3$ upon the end of the cloth segment I, and the positions of the parts are such that as the stud $e'$ rides over the V-shaped cam $e^2$ the bolt is drawn back and the end of it enters the slot in the stud $e^3$ as the stud $e'$ separates from the cam $e^2$. The consequence is that this bolt $e^2$ while it engages the stud $e^3$ causes the cloth segment I to travel completely around, along with the wheel 11 as it revolves in the direction of the arrow, Fig. 4, and having reached the extreme movement the grippers are still holding the cloth, and the stud $e^3$ is in line with the cam $e^2$, and hence the bolt $e$ has been drawn out from the projection $e^3$, and as the wheel 11 commences to move in the opposite direction to the arrow, Fig. 4, the bolt $d$ draws back from the arm $j$ of the gripper-shaft and allows the spring to open the grippers, but the edge of the cloth has been taken by another set of grippers, as hereinafter described, immediately before the grippers $i$ open.

In consequence of the bolt $e$ having been drawn out from the block $e^3$ the cloth segment is allowed to stand still while the wheel 11 makes rather more than a complete revolution in the opposite direction to the arrow, Fig. 4, and in so doing the beveled end of the bolt $d$ runs over the arm $j$ of the grippers and springs in ready to carry around the cloth segment, as before described; and it is to be understood that as the cloth segment with the cloth upon it is carried around the cloth is pressed against the surface of the glue-cylinder $H^2$ and receives upon it the proper quantity of glue, but glue is not deposited upon the cloth segment itself when there is no cloth upon the segment, because the layer of glue upon such glue-roller is not thick enough to touch the metal surface of the cloth segment. It is necessary to apply a detaining force to the cloth segment to prevent it turning back as the bolt $d$ runs over the arm $j$, and for this purpose a spring-bolt $k$ with an inclined end (see Fig. 47) is provided, passing into a notch in one head of the cloth segment I, but this stud yields when the cloth segment receives its movements, as before described.

*Means for carrying the glued cloth away from the cloth segment.*—The devices for this object are somewhat similar to those in the aforesaid patent, with modifications for rendering the action more positive. The band-pulleys K, Figs. 2 and 4, are adjacent to and connected with the gear-wheels $g$ $g$ at each side of the machine and within the frames, and the bands $l$ $l'$ are fastened at their ends to these pulleys, each pulley having two grooves, and the bands pass off horizontally above and below these pulleys, and the upper bands are connected at their back ends with the cross-bar L, that slides at its ends in the grooved inner top portions of the frames B B', and the lower bands $l'$ extend around the back band-pulleys K' and are connected at their ends with the cross-bar L, so that the same is moved bodily toward and from the cloth segment. The gripper-shaft $m$, Figs. 6 and 26 to 29, is provided with fingers $n$, that close down upon the edge of the covering fabric, and the fingers $o$, that project from the cross-bar L, underrun the cloth, so that the edge is firmly grasped by the grippers. The grippers are opened by springs $m'$, and upon the gripper-shaft $m$ are arms $n'$, extending to the rear, and the cross-rod $o'$ passes below said arms $n'$, and this rod $o'$ is moved bodily and laterally, so that as it passes backward under the rear ends of the arms $n'$ the grippers are closed, and when it is moved forward toward the gripper-shaft the grippers come open. The ends of the cross-rod $o'$ are received in the slide-blocks $o^2$, and the slotted bars $p$, (see Figs. 1, 26, and 27,) to which the ends of the bands $l\ l'$ are fastened, rest upon shoulders or flanges of the slide-blocks $o^2$, and a screw for each slotted bar passes through a spring $p'$ and through the slot of the bar into the projecting portion of the slide-block $o^2$, the spring $p'$ applying a friction to the slotted bar, but allowing such slotted bar to move with the bands to a limited extent, while the cross-bar L and the slide-block $o^2$ remain stationary. The ends of the cross-bar L come against the inner surfaces of the side frames B B', and upon the top of this cross-bar at the ends there are latch-pieces $L^2$, that are screwed firmly in position and project into grooves in the inner faces of the frames B B', so as to support the cross-bar and allow it to be moved bodily back and forth. There are four springs $q'$, each with a block $q$ on its under side to engage the depressions in the top surfaces of the latch-pieces $L^2$, and these springs $q'$ are attached at their back ends to blocks $q^2$, that pass into the longitudinal grooves in the inner faces near the top of the side frames B B', and are held in position by screws. Two of these springs $q'$ are near the center cross-bar M, and the other two are near the cross-bar $B^3$. (See Fig. 2.) The blocks $q$ at the under sides of the springs $q'$ are wide enough to extend over the outer ends of the slide-blocks $o^2$, and upon these slide-blocks, and preferably made of separate pieces fastened to their ends, are the lifters $o^3$. (See Figs. 26 and 31.)

As the bar L and the parts connected therewith are drawn by the bands $l\ l'$ up to the cloth segment the bar L is stopped by the blocks $q^2$, supporting the stationary springs $q'$, and the latch-pieces $L^2$ at the ends of the bar L having run under the downward-projecting blocks $q$ on such stationary springs $q'$ the blocks $q$ spring down into the recesses and hold the cross-bar, and as the bands commence to move in the opposite direction the slotted bars $p$ move the slide-blocks $o^2$ and by the cross-rod $o'$ first close the grippers, and then the inclined lifters $o^3$ raise the blocks $q$ and springs $q'$ and allow the cross-bar L and the parts therewith connected and the glued piece of cloth fabric to be carried bodily to the place where the boards and back-lining are applied to it, and as the cross-bar L is stopped against the blocks that carry the stationary springs $q'$ near the cross-bar M, the latch-pieces $L^2$ at the ends of the cross-bar L having underrun such springs $q'$, said bar L is held by them. A slight forward reverse movement is now given to the bands $l\ l'$, the slotted bars $p$ and slide-blocks $o^2$ move the cross-rod $o'$ toward the grippers and allow the spring to open such grippers, and the parts remain in this position until a further forward movement is given again through the bands $l\ l'$, and the inclined lifters $o^2$ are still further moved and lift the springs $q'$ from the latch-pieces $L^2$ at the ends of the cross-bar L, allowing the same to be moved bodily forward with the grippers open ready to take another piece of cloth fabric in its glued condition from the cloth segment, and as the latch-pieces $L^2$ at the ends of the cross-bar L underrun the springs $q'$ near the cross-bar $B^2$ and lift the same the cross-bar L is stopped by the stationary projections carrying the ends of the spring, sand the blocks on the under sides of the springs hold the cross-bar in position, and the reverse movement given through the bands $l\ l'$ carries the slide-blocks $o^2$ and the cross-rod $o'$ backward, closing the grippers and simultaneously raising the springs $q'$ by the action of the inclined lifters $o^3$ and liberating the cross-bar L and allowing it to be carried bodily and backward for placing the glued fabric in position for receiving the boards and back-lining, as aforesaid. In these movements the blocks of the springs $q\ q'$ determine the stopping-places of the cross-bar L, and these blocks can be adjusted readily in the grooves at the top of the frame, so as to insure accuracy in the movements given to such cross-bar and the parts carried by it, and it will also be understood that the slots in the bars $p$ and the spring-pressure upon the bars allow such bars to slide at either or both ends of the movements without injury to any of the parts, thus rendering it unnecessary to accurately regulate the movements given to the bands $l\ l'$.

Between the side frames is a central cross-bar M, which remains in a fixed position, and the adjustments of the machine to adapt the same to different sizes of book-covers are made from this central cross-bar toward the front and rear, and also at each side equally and from the picker-shaft N, which passes through bearings on the cross-frame $B^5$.

The side bars O O', Figs. 2, 6, and 16, are parallel with the frames B B' and they pass beneath the central cross-bar M, and at the front end of the machine the ends of these adjustable side bars O O' slide in the back grooved surface of the cross-bar $B^3$, and at the extreme rear end of the machine the ends of said side bars O O' slide in the cross-bar $B^4$, and there is a frame $B^5$ extending across between the side frames B B' and beneath these adjustable side bars O O', and these adjustable side bars can be moved bodily toward and from the longitudinal center line of the machine by right and left hand screws $O^2$ and $O^5$, driven uniformly by the longitudinal shaft $O^3$ and the miter-gears $O^4$ and $O^6$, so that by rotating the screw-shaft $O^5$ and miter-gears $O^4$, shaft $O^3$, and miter-gears $O^6$ the screws $O^2$ and $O^5$ will move these adjustable side-bars to any desired point for adapting the machine to different sizes of book cases or covers, and with these side bars are carried the supports for the boards hereinafter described and also the edge-turners, that are similar to those shown in the aforesaid Letters Patent.

The platform P is supported on the platform-post P', which is guided at the bottom by a cross-bearer upon the frame of the machine, (not shown in the drawings,) and the upper part of the post P' slides in the stationary arm 13, that extends out from the back frame B⁵, and there is a spring 14 that is sufficient to counterpoise the weight of the platform and the parts carried by it, or nearly so, in order that the platform-cam may carry the platform up and down and arrest the movements of the same at the proper points, and this spring 14 is beneath the lever or arm F', that receives its motion from the platform-cam F, and the back end of this arm F' slides in a guide 15 upon the frame B⁵, and the front end of the arm F' is provided with a roller or pin entering the grooved cam F, and by which the movements are given to the platform.

At the upper end of the post P', Figs. 4 and 6, is the platform-base 16, with a hole in it for receiving the upper end of the shaft, and there is a guide-clamp 17, that is permanently clamped near the upper end of the shaft, and in this guide-clamp is a hole into which passes a pin 142 upon the platform-base, so that this platform-base and the parts carried by it can be lifted off the upper end of the post P' for adjustments or returned into position, the pin on the platform-base entering the hole in the guide-clamp and bringing the parts accurately to place, and a screw 143 is provided, either in the guide-clamp 17 or on the under side of the platform-base 16, for accurately adjusting the point to which the platform-base will pass down upon the post and thereby determine the level of the top of the platform that supports the cover while the edges of the fabric are being turned and the operations heretofore indicated performed.

The edges of the platform-base 16 are grooved for receiving the gibs 18, that are fastened under the adjustable cross-bar 19, that rests upon the top of the platform-base, and these gibs allow this bar to be moved bodily toward the front or toward the back of the machine, and there is a second cross-bar 24, that is permanently bolted to the platform-base 16, and these bars 19 and 24 carry platform extension-blocks 25, and the edges of the bars 19 and 24 are grooved to receive the hook-shaped flanges extending down from the platform extension-blocks. Hence these blocks 25 can be slipped laterally for varying the area of the support for the cover, or these platform extension-blocks can be taken off and others substituted, so as to obtain the proper operative surface for the cover to rest upon while the edges of the fabric are being turned. These platform extension-blocks are grooved transversely to receive the fingers 27, that are sufficiently long to extend from the cross-bar 24 to the cross-bar 19, and they pass into the grooves of the extension-blocks upon the cross-bar 19, as illustrated in Fig. 2, so as to bridge over the space between the extension-blocks upon the cross-bar 19 and those upon the cross-bar 24, so that by this construction the platform extension-blocks 25 can be moved to the right and left upon the bars 19 and 24 to obtain the necessary width for the covers, and the cross-bar 19 and the blocks carried by it can be moved toward the front of the machine, the gibs 18 sliding in the grooves of the platform-base, and the sizes of the parts are such as to be adapted to covers of ordinary sizes, but when the platform extension-blocks 25 are drawn apart the movable center pieces 28 can be attached to the top surfaces of the bars 19 and 24, several center pieces being provided of different sizes, so as to fill up the central space of the platform after the adjustment to suit the size of the cover; and it is to be understood that when the glued fabric is being drawn along by the cross-bar L and grippers the platform P is raised to near the level of the under side of the cross-bar L, and the picker with the cover-boards and back-lining are swung around, as hereinafter described, and pressed down upon the fabric to deposit the cover-boards and back-lining upon the fabric, and then the platform is pressed down by the picker and the folding bars turn up the fabric at the top and bottom edges of the cover-boards, and the folding-bars come over the cover-boards to lay the fabric down upon the same, substantially as in the aforesaid patent, and then the picker presses the platform down a second time and the side folders fold over the fabric at the right and left edges of the cover, and pressure is applied at each operation to cause the glued fabric to adhere to the cover-boards.

The front folder-bar Q, Figs. 2 and 4, is adjustable toward and from the central cross-bar M by the screws $s$, that extend to the rear of the machine, Figs. 1 and 5, and are driven by a cross-shaft $s'$ and the miter-gears $s^2$, and the parts are adjusted so that the space between the edges of the front folder-bar Q and the central cross-bar M corresponds to the measurements of the cover from the top to the bottom edges. Hence the fabric is folded up by coming against these bars M and Q as the platform is pushed down by the picker, and then the edge-turners $t$ $t'$ are moved toward each other by an end motion given to the slide cam-bars $u$ $u'$, in which are diagonal slots receiving blocks with pins connected to the edge-turners $t$ $t'$, and these slide cam-bars receive motion simultaneously from the rock-shaft R and arms R', that have a rod $r'$ at their upper ends, passing into forks depending from the slide cam-bars $u$ $u'$, and the rock-shaft R receives its motion from the cam G and lever G', that are connected by a link $v'$ to an arm $v$ upon the rock-shaft R.

In the aforesaid patent there are described creasers or "nickers-in," acting at the corners of the book-cover. The nicker-in $c$, Figs. 6, 36, 37, and 38, is in the form of a block with a rib 30 upon its under side, and the lower edge of the nicker-in is rounded. This rib 30 is received into a groove on the under side of the edge-turner $t$, and there is a stock 31, having a flange at its back edge, running in a groove in the under side of the back edge of the cross-bar M, (or front folder-bar Q,) and this stock 31 is notched, as shown in Fig. 37, for receiving the nicker-in block $c$, and this stock 31 is placed so that one edge of the nicker-in is in line with the corner of the cover-board, as indicated at 32. Hence after the edge of the fabric has been turned vertically by the descent of the platform, as illustrated in Fig. 38, and motion is given to the edge-turner $t$, the fabric is turned over upon the cover-board and the nicker-in presses down the folded fabric in the form illustrated in Fig. 37, and this operation corresponds with the operation performed in making book-covers by hand, so that the fabric at the extreme corner is folded; and it will be observed that the nicker-in $c$ and the stock 31 are also held in their proper positions at the angle by the downward projection 33 upon the nicker-in and the similar projection 34 upon the stock 31 passing into the groove 35 on the top of the second edge-turner O or O'.

The nicker-in is liable to receive glue upon its under surface because it slides over the glued surface of the fabric after it has turned in the fabric at the corner. To remove this glue, a spring 36, Figs. 36, 37, and 38, is fastened at its back end on the under side of the stock 31 and its front end lies closely adjacent to the edge of the nicker-in $c$, as seen in Figs. 37 and 38, and it will be observed that the stock 31 remains stationary while the nicker-in $c$ is moved forward along with the edge-turner $t$, and hence as the nicker-in is drawn back by the retraction of the edge-turner the nicker-in is moved over the spring 36, the end of which scrapes off any adhering matter from the edge-turner, and there is opportunity for this to drop away, and upon reference to Fig. 37 it will be observed that the notch in the stock 31 is made with a scraping edge 37, closely adjacent to the operative side of the nicker-in, so that as the nicker-in is drawn back the edge 37 scrapes the side of the nicker-in to remove any adhesive material that may be thereon. It is to be understood that a stock, a nicker-in, and its spring are applied at each angle of the cover, the parts being made in reverse or handed, so as to occupy the proper relative positions and act in the manner before described.

After the top and bottom edges of the fabric have been folded over as aforesaid the edge-turners $t$ are allowed to remain in a projected position momentarily while the pressure upon the picker is sufficiently relieved to allow the cam F to raise the platform and apply a pressure between the under surface of the edge-turners $t$ $t'$ to cause the adhesive material to firmly affix the fabric to the cover-boards. After this the picker is again forced down, carrying with it the platform and the cover-boards and turning the fabric at the right and left hand edges of the cover upward by contact with the second folders O O', and below these folders O and O' are the second edge-turners 38, that are acted upon by slide cam-bars 39, that receive motion from the lever $G^2$, shaft $G^5$, arms $G^3$, and rod $G^4$, as illustrated in Figs. 4 and 6, these parts being substantially the same as in the aforesaid patent, and the edge-turners fold the fabric at the right and left hand edges of the cover over the cover-boards, and the picker is now caused to rise and pressure is applied by the platform and against the under sides of the edge-turners to cause the glued fabric to firmly adhere to the surfaces of the cover-boards, the cam F acting to lift the platform.

The device for supplying cover-boards and back-lining to the picker will be hereinafter described, and at this point I will describe the manner in which the cover that has been completed, as aforesaid, is carried off and subjected as a whole to pressure. As soon as the last pressure has been given to the folded edges, as aforesaid, the platform descends slightly, carrying the cover with it, and the discharging-slide 40, Figs. 2 and 6, which is in the form of a bar, is moved transversely across the platform and carries the cover bodily into the finishing-press. This discharging-slide 40 is supported at one end upon the bar 41 and slides at the other end in a groove in the bar $B^3$, and it has thin plates 42, that pass above and below the cover, so as to prevent the discharging-slide passing above or below the cover, and at this time the platform is held in such a position that the discharging-slide passes in contact, or nearly so, with the top surface of the platform, and there is a belt 43, passing around pulleys 44 and 45 and pulleys 46 to pulleys 47, Figs. 6 and 8, where the ends of the belts are secured, and this pulley 47 is rotated first in one direction and then in the other by a pinion and rack lever $D^2$, (shown by dotted lines in Fig. 3,) the rack receiving its motion from the cam D.

The pulley 44 is shown in Fig. 6 and the pulley 45 is shown in Fig. 8, the belt 43 passing around these pulleys and the slider of the discharge-slide 40 being fastened to such belt 43, and the proper motion is given to the parts, so that the discharge-slide 40 carries the finished book-cover bodily out into the finishing-press, (represented in Figs. 3, 7, and 8,) the finishing-press being connected with the side frames B' and extending out at the right side of the machine. A portion only of the frame of the finishing-press is shown in Fig. 6, and I remark that the finishing-press as represented in Fig. 8 is viewed as from the rear of the machine in order to show the parts more clearly, whereas the cross-section, Fig. 6, is viewed from the front of the machine, looking toward the back.

The side frames 48 of the finishing-press are bolted to the side frame B' of the machine and extend out to the right of the same, and the bottom plate 49 is suspended by adjusting-screws 145 below the frames 48, and there is a bed 50, over which is a sheet of rubber 51, with the edges turned down around the bed 50 and secured by clamping-bars 52 and bolts, as seen in Figs. 8 and 9, so that there is a space between the sheet of rubber and the bed 50, and water or other liquid is introduced into this space and the parts are made water-tight. Hence when there is a pressure applied to the cover between this water-bag and a platen 53 the rubber water-bag causes a uniform pressure to be applied to all the portions of the cover. This is of great advantage because it insures a uniformity in the adhesion of the glue without undue pressure at any part of the cover, which in cases where the fabric is embossed might injure the embossing.

The platen 53, Figs. 3, 7, and 8, is between the side frames 48, and there are cross-shafts 54 with arms 55 and toggles 56 to the platen 53, and the arms 57 are provided with rack-teeth at their ends, so as to insure uniformity in the movements of the rock-shafts 54 and the toggles in moving the platen 53, and at 58 a link $w$ is connected to an arm upon one of the rock-shafts, and this link extends down to the lever 59, that receives motion from a cam-groove in the back of the gear-wheel $C^2$, this cam being so shaped (see dotted lines, Fig. 3) that it gives motion to the rock-shafts, and by the toggles moves the platen 53 and applies pressure to the completed cover immediately after it has been carried out by the discharge-slide 40 and in between the water-bag 51 and the platen 53, and the parts are timed so as to hold the completed cover in the finishing-press while another cover is being made, and the pressure is relieved just before the next finished cover is carried into the finishing-press, the completed cover being carried out of the finishing-press in the manner next described.

Between the side frames 48 are the cross-shafts 60, connected by gearing 61, so that they will all rotate together and in the same direction, and upon these shafts 60 are toothed disks 62, the points of which are adapted to engage the cover-boards and move the cover bodily and discharge it from the finishing-press. I remark that it is found advantageous to discharge the cover by a positive movement, because sometimes there is a tendency for the cover to adhere by any slight projections of glue at the edges of the fabric, and in consequence of the cover-boards and the edges of the fabric coming upward the disks 62 hold down the cover upon the water-bag as the platen 53 is lifted up by the action of the toggles. The arbors 60, upon which the toothed disks 62 are mounted, are received at their ends in bars 157, that are screwed to the frames 48, the screws passing through elongated slots to allow the arbors and their disks to be adjusted so as to act upon the book-cover as it lies upon the water-bag or bed of the finishing-press. This adjustment allows for different thicknesses of cover-boards. While it is advantageous to make use of a water-bag upon the bed of the finishing-press, I do not limit myself in this particular, because a sheet of soft rubber alone might be employed. It will now be understood that the pulley 45 is rotated first in one direction and then in the other, but from the same a motion is given to the gearing 61 by providing an internal ratchet-wheel on the pulley 45 and a pawl 63 (see Fig. 20) upon a pinion 64, which gears into the intermediate 65, from which motion is given to the gearing 61, and the parts are so timed that as the discharging-slide is drawn back by the belt 43 the pulley 45 rotates without turning the gearing, but as the discharging-slide commences to carry another book-cover off the platform into the finishing-press the pawl 63 gives motion to the gearing and to the toothed disks and carries the completed cover out from the finishing-press onto the receiving-bracket T, so that the press is ready for the next cover to be brought into it. There are pendent guard-plates 152 from the shafts, that terminate slightly above the teeth on the bottom edges of the disks, which guard-plates prevent injury to the water-bag by only allowing such teeth to slightly scratch the surface of the water-bag.

Hanging down from the frames 48 is a vertical slide-bar T', which is grooved, as shown in Fig. 10, and in this groove is a block 66, that is bolted to the vertical portion of the bracket T, and there is a spring 67 within a recess in the block 66, and the friction exerted by this spring is regulated by the screw 68, and it will now be understood that this block 66 forms a guide and a support for the bracket T and that this bracket T can descend upon the slide-bar T' as the covers are added to it, and the platen 53 extends out slightly over the back end of the receiving-bracket T. Hence it will be noticed that the covers are carried out successively upon the bracket T, and the projection 69 on the end of the platen 53 forces the bracket and the accumulated covers down at each movement of the platen, so that the top cover upon the bracket is slightly below the top of the water-bag, and hence the next cover is free to pass out upon the pile of covers resting upon the bracket T.

It is advantageous to provide bars 70 extending out from the cross-bar 71 between the frames 48, one of such bars 70 carrying a stop 72 for the advancing edge of the covers, and there are hanging aprons 73 with their lower edges bent inward, as seen in Fig. 3, to form guides for the edges of the covers to slide upon, so that the edge of one cover will not become caught against the board of the previous cover near the back-lining, and these aprons yield as the covers are forced down upon the pile. The edges of the aprons nearest the press are bent out, as seen in Figs. 3 and 8, to allow the covers to freely enter between the aprons. When the covers have accumulated sufficiently, they are removed and the bracket raised up to position and the operations repeated.

*Means for supplying the cover-boards.*—As before intimated, the adjustable side bars O O' extend to the rear of the machine, and these are provided with hopper-extension bars 74, passing over the cross-bar B⁴. The bars O O' and 74 are permanently connected and adjusted as aforesaid, and there are plates 75 extending up any desired height to form the outer sides of the cover-hoppers, and there are plates 76 upon the bars 77, that form the inner sides of the cover-hoppers, and the movable blocks 78 at the back edges of the piles of cover-boards serve to keep the cover-boards in their proper positions, and there are stop-bars 79 at the front edges of the plates 75 and 76 for determining the positions of the front edges of the cover-boards, which cover-boards are shown at 80, but these stop-bars 79 do not extend down to the hopper-bars 74 and 77, (see Figs. 5 and 43,) there being sufficient space below the lower ends of the stop-bars for one cover-board at a time to be drawn out at the bottom of each pile. The back edges of the bars 79 are inclined, as seen in Figs. 5 and 43, so that the cover-boards will easily pass out under such bars 79.

Upon reference to Fig. 14 the shape of the hopper-bars sectionally will be understood, such bars being grooved for the reception of a slider 81 at each side of the machine, and this slider has upon it a claw or finger 82 upon a spring, as shown in Figs. 1 and 15, so that as the slider is moved backward the claw springs down and passes under the pile of cover-boards in the hopper and springs up into a position for carrying off the bottom board of the pile, as seen in Figs. 15 and 43. The nearly horizontal portion of this claw limits the upward movement of the spring by coming into contact with the under side of the cover-board.

The cross-shaft 83, Figs. 1, 5, 13, and 16, has upon it band-wheels 84, with the bands 85 passing around the pulleys 86, and the sliders 81 are connected with the bands, and the ends of the band are connected to the band-wheels 84 so that they cannot slip, and each time the shaft 83 is partially revolved in one direction two cover-boards are brought forward from their respective hoppers into position to be taken by the picker, and such boards lie upon the hopper-bars 74 with their outer edges against the ribs of such bars, as seen in Figs. 1 and 14, and they also rest upon the bars 77, and they are brought forward until their advancing ends are arrested by the gage-bar 87. In practice it is found that the cover-boards vary slightly in their measurements, and it is important to keep the outer edges of the cover-boards against the gage-ribs upon the bars 74. With this object in view spring-blades 88 are placed in recesses in the bars 77, and these spring-blades have tongues projecting and acting against the edges of the cover-boards to press said cover-boards outwardly into their proper positions, and these springs yield for any inequalities in the cover-boards. It is also advantageous to provide one or more wire fingers 89, beneath which the cover-boards are moved, such wire fingers preventing the cover-boards rising and becoming misplaced as they are moved along upon the hoppers.

It is advantageous to allow the claw 82 to yield slightly after the end of the cover-board has been arrested by the gage. With this object in view a helical spring 148, Figs. 1, 15, and 48, is inserted between the slider 81 and the base of the claw, and this is easily accomplished by connecting each belt 85 with a block 147, that is fastened by bolts in a slot to the slider 81, and the base of the claw is connected to the slider by bolts passing through a slot in the slider, the helical spring at 148 intervening between one of the bolts and the slider. It will be apparent that the sliders and claws have to receive substantially the same extent of motion, regardless of the size of the cover-board, but the sliders and claws require to be set farther back for larger cover-boards and the reverse. To effect this object, the shaft 83, which carries the band-wheels, can be partially turned in the sleeve by loosening the screw 157, and in this way the sliders and claws can be set in any desired positions, so that they move back sufficiently far to engage the back edges of the covers for carrying them into position to be taken by the picker.

*Back-lining devices.*—The back-lining of the book is to be of greater or less width according to the thickness of the book, and it is necessary to adjust the bars 77 to provide greater or less distance between the adjacent edges of the cover-boards. These bars 77 are adjusted by the right and left hand screws 90, which are connected by the miter-gears 91 and shaft 92, and as these bars 77 are adjusted the springs 88 are moved with them and also the plate 76, so that the parts that act upon the inner edges of the cover-boards are adjusted to suit the width of the back-lining.

It is found advantageous to make use of paper for the back-lining, and to support a roll of paper the troughs 93 are provided, the same being in the form of plates fastened at their upper ends to the cross-bar B⁴ and having inclined flanges extending toward each other, as seen in Figs. 5 and 18, so that the roll of paper can rest upon such flanges and thereby a small detaining friction will be applied to the paper, and the strip of paper passes off between the pair of rolls V and then through the pair of feeding-rolls W, and these are moved, as hereinafter described, so that the strip of paper 161 is projected by the feed-rolls W upon the inner top parts of the bars 77 and between plates 154, carrying the spring-blades 88, as illustrated in Fig. 1, and the extent of movement given to the back-lining strip 161 is sufficient to supply the proper length for the back-lining, and the end of the back-lining strip 161 should stop in line with the cover-boards, as indicated in Fig. 1, there being only one cover-board shown as in position and the back-lining in its place, and the picker as it descends to pick up the cover-boards and the back-lining, as hereinafter described, acts upon the cutter 94, which is a thin blade adjacent to a stationary bed-shear 95, and cuts off the back-lining ready to be taken away by the picker.

The rolls V are represented in larger size in Fig. 17. Each roll has a circular cutter 96, and these cutters stand in opposite positions, so that they form rotary shears or slitters, and next to each cutter is a disk of rubber 97, the cutter and the disk of rubber being mounted upon a hollow stock 98, revolving freely upon a pin 99, held in a downward projecting bracket 100 below the bars 77; and it will be observed by this, Fig. 17, that the cutting edges are in line with the inner faces of the plates 154, to which the springs 88 are attached, and as the strip of paper is drawn along by the feed-rolls W and between the pairs of cutters the strip of paper is cut upon its opposite edges to the required width for the back-lining and the cutters are adjusted along with the bars 77, so that they need no individual adjustment when the parts are adjusted for different widths of back-linings and the rotary cutters are made to operate upon the paper by the act of drawing the paper along between them, and such paper passes beneath the cross-bar 149 and up between the feed-rolls W, as indicated in Fig. 5, and it is projected over the blade forming the stationary shear, as shown in Fig. 5, in between the plates 154, but it is necessary to give to the feed-rolls W a greater or less movement for varying the length of the back-lining. This is accomplished in the manner next described.

It will be observed in Fig. 16 that the cross-shaft 83 is supported upon hanging bearings below the adjustable side bars O O', and the shaft 83 is grooved longitudinally, and there are feathers on the band-wheels 84 passing into such groove. Hence the band-wheels will be adjusted along with the adjustment of the side bars O O' to maintain the proper position of the band-wheels in relation to the slider and claw, and for giving motion to the cross-shaft 83 the sliding rack $E^4$ is made use of, there being teeth upon the top of this rack for engaging the gear-wheel 101 upon the shaft 83, and this rack $E^4$ also gives motion to the picker-shaft, hereinafter described, and receives its movement from the cam E. The shaft 83 is also supported by the U-shaped frame 102, secured to and extending out from the cross-bar $B^5$, (see Fig. 13,) and the rack $E^4$ slides in a support at one side of this frame, as seen in Figs. 16 and 21.

Referring to Figs. 13, 16, and 21, it will be understood that the wheel 101 is loose upon the shaft 83, and there is a sleeve 103 around this shaft 83 between the frames 102, and upon this sleeve is a clutch 104, sliding on a feather upon the sleeve, so that the two are connected, and there is a pin 105, that engages the wheel 101. This clutch 104 can be slipped upon the sleeve 103 in either one direction or the other by the fork 106, that is supported at the other end by a shaft 107, from the lower end of which a lever 108 extends, and there is a rod 109, (see Fig. 16,) that extends to the front end of the machine, so that the attendant by this rod can connect the clutch 104 with the wheel 101, so as to give motion to the parts that feed in the cover-boards and the back-lining or stop the same without arresting the movements of the other parts of the machine, and around this sleeve 103 is a gear-wheel 110, connected to the sleeve by a friction device, such as a washer and nut 111, so that the friction is sufficient for giving motion to the parts; but the sleeve can turn without the gear-wheel if the latter is stopped. This gear-wheel 110 need not have teeth all the way around it, as the shaft 83 does not receive a full rotation, and this wheel 110 gears into the wheel 112 upon the shaft 113. This shaft and the parts connected with it are shown in plan in Fig. 13 and section in larger size in Fig. 22, and the wheel 112 is loose upon the shaft 113, and there is a frictional connection similar to a frictional wheel-feed in a sewing-machine between such gear 112 and the shaft 113, so that when the wheel 112 is turned back the shaft 113 will stand still, and when it is turned forward the shaft 113 will be rotated with the wheel 112, and upon the outer end of the shaft 113 is a wheel 114 and intermediate gear 115, that gives motion to the gears 116 upon the arbors of the paper-feed rolls W.

Any suitable frictional connection can be employed between the gear 112 and the shaft 113. I have, however, represented a circular flange 117, fastened upon the shaft 113, with a grooved ring 118 between the face of the flange 117 and the gear 112. There is preferably a disk permanently fastened to the wheel 112 and intervening between the same and the ring 118, and in the flange 117 is an annular groove receiving the cramp-block 119, rigidly connected by a screw with the ring 118, and there is a spring 120 acting against the ring 118 and at right angles or nearly so to the cramp-block 119 and the pin 179, entering a mortise in the ring 118, opposite to the block 119, to cause the ring to turn with the gear 112. When the wheel 112 is moved in one direction by the wheel 110, the cramp-block 119 binds in the groove of the flange 117 in consequence of the pin 179 acting in the same direction as the spring 120 to give lateral motion to the ring 118 and cause the corners of the block 119 to bind in said groove, and when moving in the other direction the cramp-block slides freely in the groove of the flange 117 in consequence of the pin 179 acting against the spring to bring the ring 118 concentric and cause the block 119 to slide without binding. Hence the shaft 113 is turned in one direction only, and the movements are given through the shaft 113 and gear 114 to the feed-rolls when such shaft 113 is turned. Upon the gear 110 a pin 121 projects, and it is stopped in one direction by a fixed pin 122 and in the other direction by the pin 123 in a segmental slot in the frame 102, (see Fig. 12,) and by adjusting this pin 123 the point at which the feed-rolls will be stopped in projecting the back-lining is determined, and it will be apparent that the movement of the gear 110 being limited by the stops 122 and 123 the feeding in of the back-lining can be accurately regulated, and the shaft 83 can receive a further turning movement in either direction without moving the gear 110 in consequence of the connection between the sleeve and the gear 110 being frictional, and the amount of friction can be readily adjusted by the washer and nut 111, so that there will not be any slip in the feeding in of the back-lining. In order to prevent the end of the back-lining from adhering to the bed-shear, a spring 150 may be introduced in the throat or opening through which the back-lining is passed to lift the end of the back-lining off the bed-shear and thereby insure its proper movement over the supports upon the edges of the bars 77. This spring 150 is simply a thin plate of metal attached at the edge that is nearest to the feed-rolls W, as seen in Fig. 1, and the edge near the bed-shear 95 is curved slightly upward, as seen in Fig. 5, so as to raise the end of the back-lining strip after the shear has cut off the back-lining.

When the cover-boards are quite thin, the pressure on their edges of the springs 88 may buckle such cover-boards and prevent the pickers lifting them by the suction. To prevent this, the springs 88 may be adjusted by screws 158, (see Fig. 51,) so that the springs 88 only act as guides and do not press upon the edges of the cover-boards.

The shear or cutter 94 is pivoted at 137, and there is preferably a spring 138 (see Fig. 39) to raise the cutter, and the picker as it is brought down, as hereinafter described, acts upon this shear to give motion to the same, and it passes above the top of the stock 139 of the shear, and a finger 124 passes into an opening in the picker-arm, as illustrated in Fig. 16, so that as the picker is lifted the shear is raised automatically and reliably by the arm N' acting upon the pin 124, and the spring 138 aids in moving and holds the shear in the position shown by full lines in Fig. 16.

*Picker or transfer mechanism.*—In the aforesaid patent there is a picker acting by pins to transfer the cover-boards to the glued cover fabric. The present invention includes means for more reliably actuating the picker.

The picker-shaft N, Figs. 1, 2, and 4, is supported in the bearings 15 and 126, that extend out from the cross-frame B⁵, and the pinion 125, surrounding the picker-shaft N, is made with a sleeve extending up to the top of the bearing 126, the pinion itself being between the lower end of the bearing 126 and the bearing or arm 13, and this pinion receives motion from the rack E⁴, that is actuated by the cam F and lever F², and the picker-shaft and picker are raised and lowered by the cam E and lever E², and the upper part of the picker-shaft is tubular, and there is a key 127 in the pinion 125, and the picker-shaft N is grooved longitudinally for the key, so that the shaft and pinion turn together, but the shaft can be moved vertically through the pinion. In the bearing 126 there is an annular recess at 128, from which extends a tube 155 to the pump X, (see Figs. 1, 3, and 11,) and this pump is actuated by the lever E', so as to produce a suction or minus pressure in the annular recess at the proper time, and the sleeve of the pinion 125 is slotted, and there is a lateral opening into the tube of the picker-shaft N at this slot in the sleeve of the pinion, so that suction can be applied at the proper time from the pump and through the tubular picker-shaft into the picker-arm N', which is also hollow, as shown in Fig. 4, and there are tubular connections and flexible tubes 129 to the picker-blocks 130 and 131, which blocks are supported upon bars 132 and 140. The bar 140 is secured to the under surface of the picker-arm N', and the adjustable bar 132 is attached by gibs 141, secured to the base of the picker-arm, and the blocks 130 can be set farther out, in or according to the size of the cover-boards, or the picker-blocks can be slipped off the bars and others inserted of different sizes, and the picker-blocks 130 are adapted to act upon the cover-boards, and the blocks 131 are adapted to act upon the back-lining, and these blocks 131 are secured to the under side of the bars 132 and 140. The picker-head is formed with arms 134, projecting at right angles to the main portion of the arm N', and there are tubular openings at the ends of these arms 134, and there are vertical studs 133, supported from the central cross-bar M, and these are accurately in a plane passing through the center of the picker-shaft and parallel to the sides of the central cross-bar M.

It will now be understood that the picker-shaft and picker are raised vertical until the blocks 130 and 131 are above the cross-bars and the arms 134 are above the upper ends of the studs 133, and at this time the rack E⁴ receives an end motion and gives to the pinion 125 and picker-shaft N a half-revolution in either one direction or the other, and as the picker-shaft and the parts carried by it are lowered the studs 133 act as guides for insuring the proper position of the picker; and it is advantageous to cut away the lower portions of the arms 134 at one side, so that as the picker is swung around the upper end of the highest stud 133 will arrest the movements of the arms 134, so that the picker and its shaft can be immediately lowered, with the holes in the arms 134 receiving the vertical studs 133, so that the movements can be comparatively rapid, and the positions of the parts will be positively determined.

The under surfaces of the picker-blocks are recessed to a greater or less extent and receive elastic suction-cups 156, as seen in Fig. 41, so that when the picker is swung around over the cover-boards and back-lining and lowered to rest upon them and a minus pressure or suction is applied through the tubular picker-shaft and flexible tubes 129 the picker-blocks engage and hold firmly the cover-boards and the back-lining, and the picker is raised bodily and swung around a half-revolution and then arrested by the studs and the parts lowered, so as to bring the cover-boards and the back-lining properly down upon the glued muslin that is in position for receiving such boards, as before mentioned.

The suckers for the back-lining are preferably made of rubber strips secured to the under surface of a metal plate and projecting down below the plane of the cover-boards, so as to properly rest upon the thinner back-lining, and the suction-tubes continue as holes through these rubber blocks.

Bearing in mind the general statements made in the commencement of this specification, it will now be understood that two cover-boards and the back-lining are brought into position. The picker-block is swung around over them, and as it is brought down the back-lining is cut off from the strip. The boards and back-lining are lifted up by the picker and swung around over the platform, and by this time a glued cover fabric has been brought along to position and the platform raised to receive and support such glued fabric, and the picker is lowered, deposits the cover-boards and back-lining upon the glued fabric, and applies pressure to the same as the platform is forced downward, and the top and bottom edges of the fabric are turned as before described, and the nickers-in act, and the platform is forced down still farther, and the right and left hand edges of the cover fabric are folded over and pressed firmly, and as the picker is relieved, rises, and is swung around the discharge-slide carries out the completed cover to the finishing-press, two cover-boards are brought from the hoppers into position, the back-lining strip is projected, and the parts are ready for the picker to descend and the operations to be repeated.

I claim as my invention—

1. The combination with a vessel for containing glue or similar adhesive material, of a glue-roll and means for turning the same first in one direction and then in the other, and two scrapers, one for regulating the thickness of the glue upon the surface and the other for scraping the surface, substantially as set forth.

2. In combination with a vessel for containing glue or similar adhesive material, a glue-roll and means for turning the same first in one direction and then in the other, and two scrapers one for regulating the thickness of the glue upon the surface and the other for scraping the surface and means for adjusting the scrapers, substantially as set forth.

3. The combination in a book-cover machine, of a glue-roll and glue vessel, a cloth segment and grippers, mechanism for turning the glue-roll first in one direction and then in the other, and a shaft for supporting the cloth segment, means for revolving the shaft first in one direction and then in the other, means for connecting the shaft and the cloth segment when the shaft is revolving in one direction and disconnecting the same and holding the cloth segment when the shaft is revolving in the other direction, substantially as set forth.

4. The combination with a vessel for containing glue or similar adhesive material, of a glue-roll and means for turning the same first in one direction and then in the other, and means for regulating the thickness of the glue left upon the surface of the roll, substantially as set forth.

5. The combination in a book-cover machine, of a cloth roll or segment, means for revolving the same, a glue vessel and glue-roll and means for turning the glue-roll first in one direction and then in the other, and a scraper for regulating the thickness of the glue upon the roll as it is brought into contact with the cloth on the segment, substantially as set forth.

6. The combination with the cloth segment, of grippers, a shaft for the cloth segment, a gear-wheel upon the shaft, a spring-bolt carried by the gear-wheel and adapted to engage the arm of the gripper-shaft for closing the grippers and revolving the cloth segment, and a bolt for holding the cloth segment while the gear and its spring-bolt are revolved in the opposite direction, substantially as set forth.

7. The combination with the cloth segment and its gripper-shaft and grippers, of a spring-bolt and its support for actuating the grippers and rotating the cloth segment, a second bolt for connecting the cloth segment and actuating device, a stationary cam for disconnecting the second bolt, and a spring-bolt for holding the cloth segment during the movement in the opposite direction of the actuating device, substantially as set forth.

8. The combination with the glue-roll and means for revolving the same first in one direction and then in the other, of a cloth segment and a wheel for revolving the segment with the cloth in contact with the glue-roll, grippers upon the cloth segment, a gage for determining the position of the cloth on the segment, and means for moving the gage out of the way before the cloth and segment are revolved, substantially as set forth.

9. The combination in a book-cover machine, of a platform and post, means for supporting and for raising and lowering the platform-post, a platform-base removable from the upper end of the post, a guide-clamp extending out from the platform-post and a pin for connecting the platform-base and clamp and cross-bars and platform-sections supported by the cross-bars and forming the surface of the platform, substantially as set forth.

10. The combination in a book-cover machine, of a platform adapted to receive the covering fabric, the boards and the back-lining, a vertical post and means for raising and lowering the same, a guide-arm rigidly clamped to the upper end of the post, a platform-base to which the platform is connected and which base is removable from the upper end of the post and is located between the guide-clamp and the platform, and a vertical slip connection between the platform-base and the guide-clamp for holding the parts in their proper relative positions and for allowing the platform and its base to be easily lifted off, substantially as set forth.

11. The combination with the edge-turners for folding the cloth over the edges of the cover-boards, of movable nicker-in blocks acting at the corners of the cover and stationary scrapers for removing from the nicker-in blocks glue or adhesive material, substantially as set forth.

12. The combination with means for folding the fabric over the edges of the cover-boards, of nicker-in blocks, a stock for each nicker-in block, a rib and groove for moving the nicker-in block by the folder and a guide rib and groove for holding the nicker-in in position, substantially as set forth.

13. The combination with means for folding the fabric over the edges of the cover-boards, of nicker-in blocks, a stock for each nicker-in block, a rib and groove for moving the nicker-in block by the folder, and a guide rib and groove for holding the nicker-in in position and a spring connected with the stock and acting to scrape the surface of the nicker-in block, substantially as set forth.

14. The combination in a machine for making book-covers with the means for bringing together the cover-boards and the glued fabric and means for turning over the edges of the latter, of a finishing-press having a yielding bed upon which is received the cover fabric and a platen and mechanism for moving the parts to apply a pressure to the entire cover and hold the same while the glue consolidates, and means for delivering the cover from the finishing-press and for simultaneously bringing in another cover, substantially as set forth.

15. A finishing-press for book-covers composed of a bed and platen, in combination with toggle-bars for giving motion to the platen, a discharge-slide for bringing the cover into the finishing-press, and toothed disks for carrying the cover out of the finishing-press, substantially as set forth.

16. The combination in a finishing-press for book-covers, of a bed, a platen, rock-shaft and toggle-bars for giving motion to the platen, cross-shafts and toothed disks passing through slots in the platen, and means for rotating the toothed disks and discharging the book-cover, substantially as set forth.

17. The combination in a machine for making book-covers, of a finishing-press having a platen, and a bed and a water-bag upon the bed, mechanism for applying pressure to hold the entire cover between the water-bag and the platen and to apply pressure simultaneously and firmly over the entire surface of the cover for holding the same while the glue consolidates, substantially as set forth.

18. The combination in a finishing-press for book-covers, of a bed having a water-bag surface, a platen and means for pressing the same upon the book-cover, toothed disks and means for rotating the same for delivering the book-covers, and guards hanging from the shafts of the toothed disks to prevent injury to the water-bag, substantially as set forth.

19. The combination in a finishing-press for book-covers, of means for passing the book-cover into the finishing-press, a bed and platen and means for actuating the latter to apply pressure to the finished cover, means for discharging the cover from the finishing-press, a bracket and frictional support for the same upon which the covers are delivered in succession, and a projection from the platen for moving down the bracket and the pile of covers successively and giving space for the reception of the next cover.

20. The combination in a book-cover machine, of means for applying the cloth to the cover-boards, a finishing-press for receiving the covers and means for applying pressure to the cover while in the finishing-press for holding the fabric firmly to the cover-boards while the glue consolidates, substantially as set forth.

21. The combination in a machine for making book-covers, of mechanism for applying the glue to the covering fabric, mechanism for bringing the boards and back-lining into position upon the glued fabric, and for turning the edges of the fabric, and a finishing-press for receiving the cover and applying a pressure to the entire surface while the glue is consolidating, substantially as set forth.

22. The combination in a machine for making book-covers, of mechanism for applying the glue to the covering fabric, mechanism for bringing the boards and back-lining into position upon the glued fabric, and for turning the edges of the fabric, and a finishing-press for receiving the cover and applying a pressure to the entire surface while the glue is consolidating, and automatic mechanism for discharging the cover from the finishing-press, substantially as set forth.

23. The combination in a machine for making book-covers, of mechanism for applying the glue to the covering fabric, mechanism for bringing the boards and back-lining into position upon the glued fabric, and for turning the edges of the fabric, and a finishing-press for receiving the cover and applying a pressure to the entire surface while the glue is consolidating, automatic mechanism for conveying the cover from the devices that fold the edges of the fabric into the finishing-press, and automatic mechanism for delivering the cover from the finishing-press, substantially as set forth.

24. The combination in a machine for making book-covers, of means for applying adhesive material to the covering fabric and for bringing the cover-boards and back-lining into contact with the covering fabric and for folding over the edges of the covering fabric, a finishing-press for receiving and acting upon the entire surface of the cover while the glue is hardening, and automatic mechanism for carrying the cover into the finishing-press and for carrying the previously-finished cover out of the finishing-press, substantially as specified.

25. The combination in a machine for making book-covers, of a finishing-press and means for delivering the cover into such finishing-press, a vertical grooved slide-bar at one side of the finishing-press, a bracket and a projection thereon entering the groove of the slide-bar, a spring and screw for adjusting the friction and means for forcing down the bracket as the finished covers accumulate upon the same, substantially as set forth.

26. The combination in a machine for making book-covers, of side bars, means for adjusting the side bars for different widths of covers, extensions upon the side bars and to the rear for receiving and supporting piles of cover-boards, and means for removing the bottom cover-board in each pile of boards and means for supplying a back-lining between the cover-boards, substantially as set forth.

27. The combination in a machine for making book-covers, of side bars, means for adjusting the side bars for different widths of covers, extensions upon the side bars and to the rear for receiving and supporting piles of cover-boards, and means for removing the bottom cover-board in each pile of boards and means for supplying a back-lining between the cover-boards, a picker and means for actuating the same and transferring the cover-boards and back-lining to position upon the glued fabric, substantially as set forth.

28. The combination in a book-cover machine with the side bars and hoppers supporting the pile of cover-boards, of means for adjusting the side bars and hopper to adapt the machine to different sizes of cover-boards, a slider received into a groove in each side bar and supported by the same so as to be adjusted with the side bars, and a spring-claw connected with each slider for acting upon the lower cover-board in each pile, substantially as set forth.

29. In a machine for making book-covers the combination of hoppers for containing the cover-boards in vertical piles, means for adjusting the hoppers to suit different sizes of cover-boards and means for varying the distance between the cover-boards for different thicknesses of books, guides for the exterior edges of the cover-boards and springs acting at the inner edges of the cover-boards for pressing them outward against the guides, and means for moving two cover-boards away from the bottom of each pile, substantially as set forth.

30. The combination in a machine for making book-covers, of means for supplying the cover-boards to position in the machine, feed-rolls for feeding a strip of paper of the proper length to form the back-lining and a cutter for severing the back-lining from the strip of paper, substantially as set forth.

31. The combination in a machine for making book-covers, of means for supplying the cover-boards to position in the machine, feed-rolls for feeding a strip of paper of the proper length to form the back-lining, a cutter for severing the back-lining from the strip of paper, and cutters acting to trim off surplus in the width of the paper for the back-lining, substantially as set forth.

32. The combination with the holder for a roll of paper, of feed-rolls for drawing along the strip of paper, circular cutters between which the paper is drawn and by which the surplus width of paper is cut off, and a shear for separating the strip of paper at the lengths required for the back-lining, substantially as set forth.

33. In a machine for making book-covers, a pair of rolls for feeding in a strip of paper for the back-lining, variable mechanism for determining the length of paper fed in by the rolls, and a shear for cutting off the strip of paper for the back-lining, substantially as set forth.

34. The combination with the sliders and claws for bringing the cover-boards from their piles and the mechanism for supporting such piles of cover-boards, of feed-rolls for supplying a strip of paper to form the back-lining and a shear for severing the strip of paper, substantially as set forth.

35. The combination with the feed-rolls for supplying the back-lining and the shear for severing the same, of a wheel and means for turning the same first in one direction and then in the other by a frictional appliance stops for determining the extent of movement given to the wheel, a pair of feed-rolls and a frictional clutch mechanism acting to give motion to the feed-rolls, and allowing the same to remain stationary as the clutch mechanism moves in the opposite direction, substantially as set forth.

36. The combination in a book-cover machine with means for supplying the covers and the back-lining, of a picker, an arm and shaft for supporting the same, mechanism for raising and lowering the picker and giving to the same a half-rotation, guide-studs for determining the positions of the picker, a pinion, sleeve and feather for giving motion to the picker-shaft, the sleeve being recessed and the picker-shaft being made tubular, and flexible tubes connected with the picker-blocks for acting upon the cover-boards and back-lining by a suction action or minus pressure and transferring them from one position to another, substantially as set forth.

37. The combination with the picker shaft and arm, of picker-blocks, means for supporting and adjusting the blocks to adapt them to different sizes of book-covers, and suction mechanism for acting between the cover-boards and the picker-blocks for lifting and moving the cover-boards, substantially as set forth.

38. The combination with the picker shaft and arm, of cross-bars connected with the arm, picker-blocks adjustable on the cross-bars, and suction-pipes passing through the picker-blocks and acting to hold the cover-boards to the picker-blocks, substantially as set forth.

39. The combination with the picker shaft and arm, of cross-bars connected with the arm, picker-blocks adjustable on the cross-bars, suction-pipes and elastic suction-cups within recesses in the under sides of the picker-blocks, substantially as set forth.

Signed by me this 4th day of August, 1896.

ARTHUR I. JACOBS.

Witnesses:
GEO. T. PINCKNEY,
CHAS. H. SMITH.